United States Patent [19]

Akatsu et al.

[11] Patent Number: 5,675,415
[45] Date of Patent: Oct. 7, 1997

[54] PHYSICAL QUANTITY MEASUREMENT APPARATUS AND INSTRUMENT THEREFOR

[75] Inventors: Toshio Akatsu, Ushiku; Sadao Mori, Tsuchiura; Masao Fukunaga, Tokyo, all of Japan

[73] Assignee: Hitachi, Ltd., Tokyo, Japan

[21] Appl. No.: 500,325

[22] Filed: Jul. 12, 1995

[30] Foreign Application Priority Data

Jul. 12, 1994 [JP] Japan ................. 6-159804

[51] Int. Cl.$^6$ ................. H04N 5/84; G03B 15/00
[52] U.S. Cl. ................. 356/364; 356/345; 356/349; 356/351; 73/862.624
[58] Field of Search ................. 356/4, 5, 373, 356/374, 364, 345, 349, 351; 250/205, 560, 561, 225, 227; 73/704, 705, 778, 702

[56] References Cited

U.S. PATENT DOCUMENTS

| | | |
|---|---|---|
| 4,902,888 | 2/1990 | Kondo ................. 250/227 |
| 4,958,929 | 9/1990 | Kondo ................. 356/345 |
| 5,101,664 | 4/1992 | Hockaday et al. ................. 73/704 |
| 5,288,995 | 2/1994 | Strachan ................. 250/227 |

FOREIGN PATENT DOCUMENTS 62-27603  2/1987  Japan .

*Primary Examiner*—Frank G. Font
*Assistant Examiner*—Michael P. Stafira
*Attorney, Agent, or Firm*—Antonelli, Terry, Stout & Kraus, LLP

[57] ABSTRACT

A physical quantity measuring apparatus in which the measurement range of the physical quantity such as displacement, pressure or the like can be widened. Laser beams different in wavelength are radiated through an optical fiber onto a diaphragm and the light reflected on the diaphragm and the light reflected on a reference face opposite to the diaphragm are returned to the optical fiber so that the distance between the reference face and the diaphragm which is transformed, and hence a pressure difference, is measured by a light interference method. The quantity of displacement of the diaphragm is measured optically by using laser beams different in wavelength from each other so that it is possible to make the measurement accuracy high and to effect measurement in a wide range with respect to a physical quantity such as displacement, pressure, or the like, without being influenced by a change in characteristic of the optical fiber.

16 Claims, 10 Drawing Sheets

PHYSICAL QUANTITY MEASUREMENT APPARATUS AND INSTRUMENT THEREFOR

BACKGROUND OF THE INVENTION

1. Field of the Invention

The present invention relates to an apparatus for measuring the physical quantity of a subject and more particularly relates to an apparatus for optically measuring physical quantities such as pressure, flow rate, and so on, in various kinds of chemical plants.

2. Description of the Related Art

Heretofore, as an apparatus for measuring the physical quantity of a subject, there is known an apparatus described in JP-A-62-27603. In order to make it possible to measure the quantity and direction of displacement of a subject without any influence of the change of refractive index of an optical fiber even in the case where the refractive index of the optical fiber changes correspondingly to various disturbance, the apparatus described in JP-A-62-27603 comprises: a laser oscillator for emitting linearly polarized light; an electro-optical crystal driven by a voltage for modulating the phase of light emitted from the laser oscillator; a polarization plane conserving optical fiber through which light given from the electro-optical crystal is made to go out to the subject side and through which reflected light from the subject side is made to go out to the electro-optical crystal side; a ¼ wavelength plate located between the subject side end portion of the polarization plane conserving optical fiber and the subject; a polarization beam splitter by which reflected light from the electro-optical crystal side end portion of the polarization plane conserving optical fiber is split into two by planes of polarization; and a measurement portion for detecting a voltage applied to the electro-optical crystal in a moment when the brightness of each of light beams extracted by the polarization beam splitter takes its maximum or minimum value and for calculating the direction and quantity of displacement of the subject on the basis of the respective applied voltages and the difference between the applied voltages.

In the aforementioned related art, polarized light from one laser oscillator is made to go out to a subject; reflected light from the subject is split into two by the polarization beam splitter; a voltage applied to the electro-optical crystal is detected in a moment when the brightness of each of light beams extracted by the polarization beam splitter takes its maximum or minimum value; and the direction and quantity of displacement of the subject are calculated on the basis of the applied voltages and the difference between the applied voltages. Accordingly, measurement can be made only in the range of a half period of the applied voltage.

On the other hand, in a measurement apparatus such as a differential pressure transmitter for measuring a pressure difference produced between two systems, a pressure difference to be measured is proportional to the square of the flow rate of a liquid used in a plant to which the measurement apparatus is applied. Further, the flow rate of the liquid used in the plant changes widely correspondingly to the form of use of the plant. For these reasons, or the like, the existing state is in that the range of measurement in the measurement apparatus cannot be set in advance.

Therefore, a preparatory operation for determining whether the range of measurement meets the plant or not, must be carried out after the measurement apparatus is practically arranged in the plant. There arises a problem that the operation is troublesome.

SUMMARY OF THE INVENTION

An object of the present invention is to provide a physical quantity measurement apparatus which can provide a measurement range corresponding to a subject to be measured, that is, in which the range of measurement is wide.

The foregoing object of the present invention is achieved by an apparatus for optically measuring a physical quantity of a subject, which comprises: two laser oscillators for respectively emitting linearly polarized light beams having wavelengths different from each other; a half mirror for transmitting the polarized light beams emitted from the laser oscillators; an electro-optical crystal driven by a voltage for modulating the phase of light emitted from the laser oscillators; a polarization plane conserving optical fiber through which light given from the electro-optical crystal is made to go out to the subject side and through which reflected light from the subject side is made to go out to the electro-optical crystal side; a ¼ wavelength plate located between the subject and the subject side end portion of the polarization plane conserving optical fiber; a beam splitter by which reflected light from the electro-optical crystal side end portion of the polarization plane conserving optical fiber is split into two correspondingly to the wavelengths; a first polarization beam splitter by which reflected light of one of the wavelengths extracted by the beam splitter is split into two by polarization planes; a second polarization beam splitter by which reflected light of the other wavelength extracted by the beam splitter is split into two by polarization planes; means for detecting voltages applied to the electro-optical crystal to obtain the maximum/minimum or averaged maximum/minimum values of brightness of light beams extracted by the first and second polarization beam splitters and for obtaining the applied voltages and a difference between the applied voltages; and means for calculating the quantity of displacement of the subject on the basis of the difference between the applied voltages obtained by the first-mentioned means.

A composite light beam constituted by linearly polarized laser beams of different wavelengths is radiated onto a subject from a polarization plane conserving optical fiber through a reference face and a ¼ wavelength plate while a high frequency voltage is applied to an electro-optical crystal to thereby modulate the phase between two linearly polarized light beams having planes of polarization which intersect each other perpendicularly. A reflected light beam from the subject is made to go back to the polarization plane conserving optical fiber. The light beam outputted from the polarization plane conserving optical fiber is split into two by the planes of polarization. The thus extracted light beams interfere with each other. The phase of light reflected from the subject relative to the phase of light reflected from the reference face changes correspondingly to the distance between the reference face and the subject, so that the brightness of interference light changes. Each of voltages applied to the electro-optical crystal is detected in a moment when the brightness of light takes its maximum/minimum value or the averaged maximum/minimum value. The physical quantity of the subject is calculated on the basis of the applied voltages and the difference between the applied voltages. As described above, by using two linearly polarized laser beams of different wavelengths, the range of measurement with respect to the subject is widened, so that adaptability to the subject to be measured can be widened.

DESCRIPTION OF THE PREFERRED EMBODIMENTS

Figure 1:
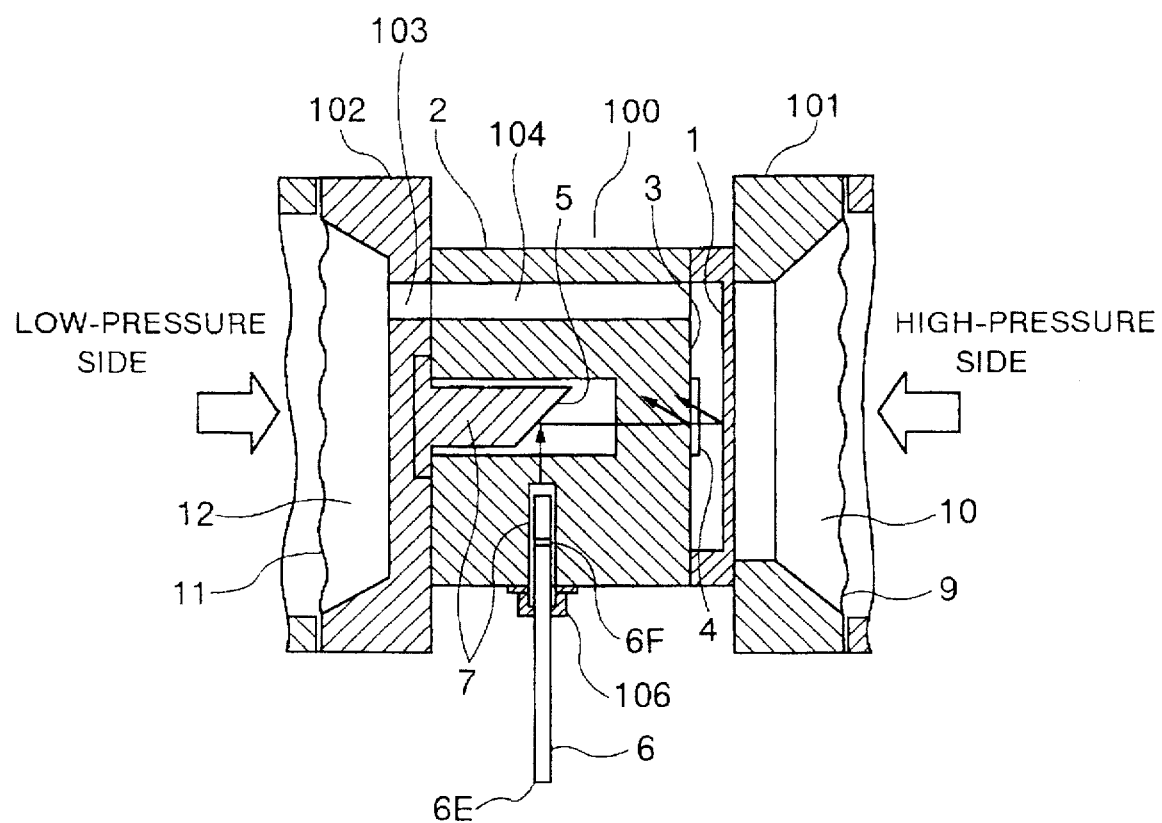
FIG. 1 is a vertical sectional view showing an example of a detector used in a measurement apparatus according to the present invention.

FIG. 1 shows an embodiment of a pressure detector constituting a measurement apparatus according to the present invention. In FIG. 1, a pressure detector 100 is provided. A diaphragm 1 made of a flexible material which is transformed correspondingly to pressure. The outer circumferential portion of the diaphragm 1 is stuck to a transparent glass 2. The glass 2 has a face which is arranged so as to be opposite to a surface 3 of the diaphragm 1. The center portion of the face of the glass 2 is coated with a ¼ wavelength film 4 by vapor deposition. A reflection mirror 5 is inserted into the center portion of the glass 2. The apparatus includes a polarization plane conserving optical fiber 6. The polarization plane conserving optical fiber 6 is detachably mounted to the glass 2 by a mounting member 106.

A laser beam is propagated in the optical fiber 6 and goes out from an end 6F of the optical fiber 6. Then, the laser beam is collimated by a rod lens 7, so that the laser beam goes out as a collimated beam. The outgoing beam is reflected by the reflection mirror 5 and enters an end face of the glass 2. A part of the incident beam is reflected by an end face (reference face) 3 of the glass 2 whereas a part of the incident beam passes through the ¼ wavelength film 4 and is reflected by a surface of the diaphragm 1. The aforementioned two reflection beams return to the optical fiber 6 through the reflection mirror 5 and the rod lens 7.

A flange 101 is provided in the diaphragm 1 side whereas a flange 102 is provided in the glass 2 side which is opposite to the diaphragm 1 side. A space between one face of the diaphragm 1 and one face of a seal diaphragm 9 is filled with a liquid 10. For example, pressure in the high pressure side of one system in a plant acts on the other face of the seal diaphragm 9, so that the pressure acting on the seal diaphragm 9 is applied to the surface of the diaphragm 1 through the liquid 10.

On the other hand, a seal diaphragm 11 is also provided in the flange 102. A space between one face of the diaphragm 11 and the other face of the diaphragm 1 is filled with a liquid 12 through a passage 103 provided in the flange 102 and through a passage 104 provided in the glass 2. For example, pressure in the low pressure side of another system in a plant acts on the other face of the seal diaphragm 11, so that the pressure acting on the seal diaphragm 11 is applied to the surface of the diaphragm 1 through the liquid 12.

The diaphragm 1 is transformed proportionally to the pressure difference between the high pressure side and the low pressure side, so that a phase difference is produced between light reflected from the end face 3 of the glass 2 as a reference face and light reflected from the surface of the diaphragm 1.

Accordingly, if the phase difference between the reflected light beams is measured, the pressure difference between the high pressure side and the low pressure side can be detected. Further, if the low pressure side is opened to the air, pressure on the high pressure side can be measured.

Figure 2:
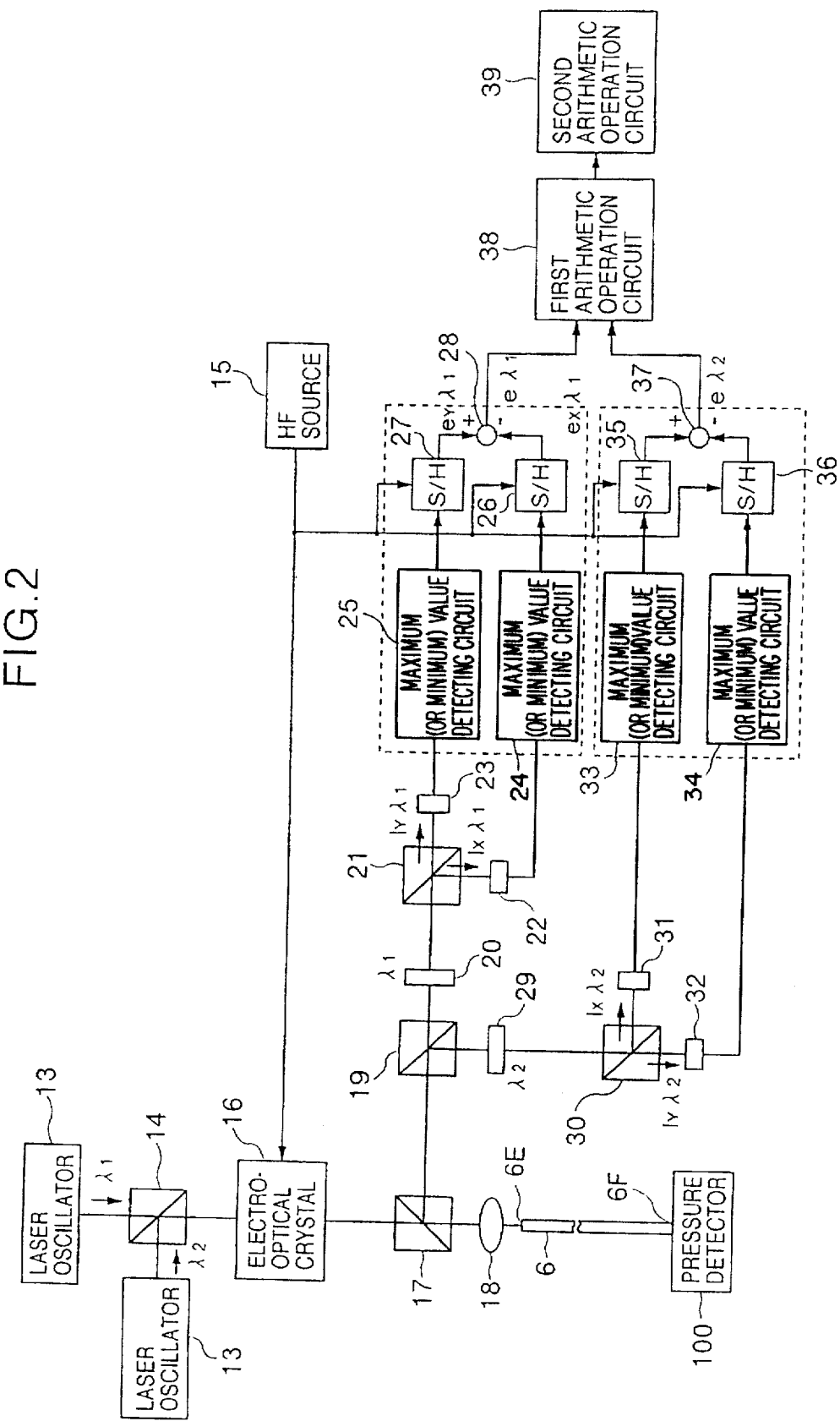
FIG. 2 is a configuration diagram showing an embodiment of the measurement apparatus according to the present invention.

FIG. 2 shows the configuration of an embodiment of a measurement apparatus according to the present invention. Like numerals in each of FIGS. 1 and 2 refer to like parts. In FIG. 2, laser oscillators 13 and 13' are provided for oscillating linearly polarized laser light beams of Wavelengths $\lambda_1$ and $\lambda_2$. A half mirror 14 is provided for combining two light beams into one composite light beam. The half mirror 14 combines two light beams while the plane of polarization of wavelength $\lambda_1$ is made coincident with the plane of polarization of wavelength $\lambda_2$. An electro-optical crystal 16 which is driven by a high frequency electric source 15 for phase-modulating incident light is arranged on the laser light axis. A beam splitter 17 for partly reflecting light and partly transmitting light is arranged on the light axis of light which has passed through the electro-optical crystal 16. A lens 18 and a polarization plane conserving optical fiber 6 are arranged on the light axis of light transmitted through the beam splitter 17.

The light transmitted through the beam splitter 17 is converged onto one end face 6E of the optical fiber 6 by the lens 18 and led to the other end portion 6F of the optical fiber 6 by the optical fiber 6 so that the light is made to go out toward the pressure detector 100 shown in FIG. 1 through the other end portion 6F.

A part of the output light is reflected by the reference face 3 in the pressure detector 100 shown in FIG. 1 whereas a part of the output light passes through the ¼ wavelength film 4, is reflected by the surface of the diaphragm 1, passes through the optical fiber 6 and returns to the beam splitter 17. Light reflected by the beam splitter 17 is further split into two by a beam splitter 19. Of light transmitted through the beam splitter 19, light of wavelength $\lambda_1$ is transmitted through an interference filter 20 and enters a polarization beam splitter 21.

The polarization beam splitter 21 splits incident light into reflected light $I_x\lambda_1$ and transmitted light $I_y\lambda_1$ by the difference between the planes of polarization of incident light.

These light beams $I_X\lambda_1$ and $I_Y\lambda_1$ are converted into electric signals by light detectors 22 and 23, respectively. Maximum (or minimum) values are detected from the electric signals by maximum (or minimum) value detection circuits 24 and 25, respectively, so that voltage values $e_X\lambda_1$ and $e_Y\lambda_1$ applied to the electro-optical crystal 16 in a moment when the maximum (or minimum) values are produced are stored in sample-hold circuits 26 and 27, respectively. The difference voltage $e\lambda_1$ between the thus stored voltage values $e_X\lambda_1$ and $e_Y\lambda_1$ is calculated by a subtraction circuit 28.

On the other hand, light reflected by the beam splitter 19 passes through an interference filter 29, so that only light of wavelength $\lambda_2$ enters a polarization beam splitter 30. This incident light is split into reflected light $I_X\lambda_2$ and transmitted light $I_Y\lambda_2$ by the difference between the planes of polarization of incident light. These light beams are converted into electric signals by light detectors 31 and 32, respectively. Maximum (or minimum) values of the electric signals are detected by maximum (or minimum) value detection circuits 33 and 34, respectively, so that voltage values $e_X\lambda_2$ and $e_Y\lambda_2$ applied to the electro-optical crystal 16 in a moment when the maximum (or minimum) values are produced are stored in sample-hold circuits 35 and 36, respectively. The difference voltage $e\lambda_2$ between the thus stored voltage values $e_X\lambda_2$ and $e_Y\lambda_2$ is calculated by a subtraction circuit 37.

The difference voltage $e\lambda_1$ from the above-mentioned subtraction circuit 28 and the difference voltage $e\lambda_2$ from the subtraction circuit 37 are inputted to a first arithmetic operation circuit 38. The first arithmetic operation circuit 38 carries out an arithmetic operation with respect to the size of the difference voltages $e\lambda_1$ and $e\lambda_2$ and the number N of times by which the difference voltages $e\lambda_1$ and $e\lambda_2$ change discontinuously. The contents of the arithmetic operation will be described later. A second arithmetic operation circuit 39 calculates the quantity of displacement of the diaphragm 1 on the basis of the arithmetic operation result obtained by the first arithmetic operation circuit 38 and calculates pressure acting on the diaphragm 1 on the basis of the quantity of displacement.

Next, the operation of the aforementioned embodiment of the measurement apparatus according to the present invention will be described.

Figure 3:
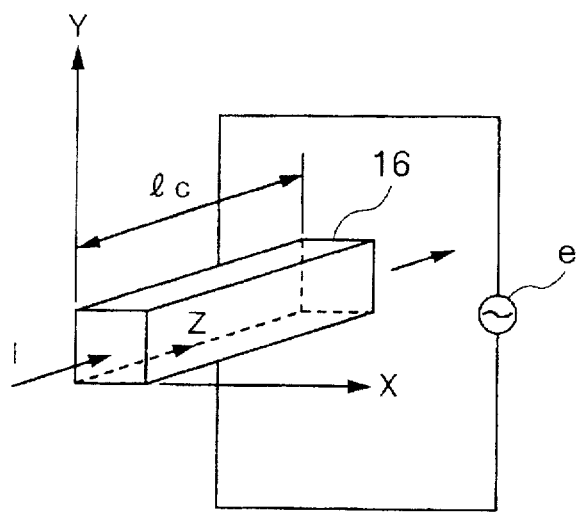
FIG. 3 is an explanatory view showing the operation of an electro-optical crystal constituting an embodiment of the measurement apparatus according to the present invention.

First, the measurement of the transformation of the surface of the diaphragm 1 which constitutes a pressure-receiving plate in the pressure detector 100 will be described. As shown in FIG. 3, the electro-optical crystal 16 has three orthogonal axes X, Y and Z and has a length $I_C$ in the direction of incidence of light I. Assuming now that the refractive index of the crystal when linearly polarized light $I_X$ having as a plane of polarization a plane parallel with the XZ plane advances in the Z direction is replaced by $n_{XC}$ and, similarly to this, the refractive index of the crystal when linearly polarized light $I_Y$ having as a plane of polarization a plane parallel with the YZ plane advances in the Z direction is replaced by $n_{YC}$, then the following expressions are obtained.

$$n_{XC} = n_{XOC} + K_{XC}e \quad (1)$$

$$n_{YC} = n_{YOC} + K_{YC}e \quad (2)$$

in which e represents a voltage applied to the electro-optical crystal 16, $K_{XC}$ and $K_{YC}$ represent constants determined correspondingly to the kind of the electro-optical crystal, and $n_{XOC}$ and $n_{YOC}$ represent refractive indexes when the voltage applied to the crystal is zero, the refractive indexes are constants determined corresponding to the kind of the electro-optical crystal.

The electro-optical crystal 16 is arranged so that the plane of polarization of laser light is parallel with a plane inclined by 45° with respect to the X axis of the electro-optical crystal 16. The laser light is decomposed into light beams $I_X\lambda_1$, $I_X\lambda_2$ having polarization planes parallel with the XZ plane of the electro-optical crystal 16 and light beams $I_Y\lambda_1$, $I_Y\lambda_2$ having polarization planes parallel with the YZ plane. The four kinds of light beams pass through the electro-optical crystal 16 and the beam splitter 17 and are converged onto the end face 6E of the polarization plane conserving optical fiber 6.

The polarization plane conserving optical fiber 6 has X and Y axes which intersect each other perpendicularly. As long as the X and Y axes of the polarization plane conserving optical fiber 6 are arranged so as to be coincident with the X and Y axes of the electro-optical crystal 16, the light beams $I_X\lambda_1$, $I_X\lambda_2$, $I_Y\lambda_1$ and $I_Y\lambda_2$ propagate in the optical fiber 6 while the planes of polarization are conserved. Then, the light beams are outputted from the end face 6F of the optical fiber 6, collimated by the rod lens 7 and inputted to the pressure detector 100. Part of each of the light beams $I_X\lambda_1$, $I_X\lambda_2$, $I_Y\lambda_1$ and $I_Y\lambda_2$ is reflected by the reference face 3 whereas the residual part passes through the ¼ wavelength film 4 and is reflected by the surface of the diaphragm 1.

Hereupon, the optical fiber 6 is arranged so that the crystal axis X-Y of the ¼ wavelength film 4 is rotated by 45° from the X-Y axis of the polarization plane conserving optical fiber 6. Assuming that light beams obtained by reflecting light beams $I_X\lambda_1$, $I_X\lambda_2$, $I_Y\lambda_1$ and $I_Y\lambda_2$ on the reference face 3 are replaced by $I_X\lambda_{1r}$, $I_X\lambda_{2r}$, $I_Y\lambda_{1r}$ and $I_Y\lambda_{2r}$, then the planes of polarization of light beams $I_X\lambda_{1r}$ and $I_X\lambda_{2r}$ become equal to the planes of polarization of light beams $I_Y\lambda_1$ and $I_Y\lambda_2$. Assuming that light beams reflected by the surface of the diaphragm 1 and inputted to the end face 6F of the optical fiber 6 again are replaced by $I_X\lambda_{1mY}$, $I_X\lambda_{2mY}$, $I_Y\lambda_{1mX}$ and $I_Y\lambda_{2mX}$, then the planes of polarization of light beams $I_X\lambda_{1mY}$ and $I_X\lambda_{2mY}$ are inclined by 90° with respect to the planes of polarization of light beams $I_X\lambda_1$ and $I_X\lambda_2$ because light beams $I_X\lambda_{1mY}$ and $I_X\lambda_{2mY}$ go and return through the ¼ wavelength film 4, so that the planes of polarization of light beams $I_X\lambda_{1mY}$ and $I_X\lambda_{2mY}$ become equal to the planes of polarization of light beams $I_Y\lambda_1$ and $I_Y\lambda_2$. Similarly, the planes of polarization of light beams $I_Y\lambda_{1mX}$ and $I_Y\lambda_{2mX}$ are rotated by 90° from the planes of polarization of light beams $I_Y\lambda_1$ and $I_Y\lambda_2$, so that the planes of polarization of light beams $I_Y\lambda_{1mX}$ and $I_Y\lambda_{2mX}$ become equal to the planes of polarization of light beams $I_X\lambda_1$ and $I_X\lambda_2$.

After the eight kinds of reflected light beams propagate in the polarization plane conserving optical fiber 6, the reflected light beams are partly reflected by the beam splitter 17 and further split into transmitted light and reflected light by the beam splitter 19. The transmitted light passes through the interference filter 20, so that only light of wavelength $\lambda_1$ is extracted. This light is further split into reflected light and transmitted light by the polarization beam splitter 21 correspondingly to the difference between the planes of polarization and converted into electric signals by light detectors 22 and 23, respectively.

Similarly, of light reflected by the beam splitter 19, light of wavelength $\lambda_2$ passes through the interference filter 29. This light is further split into reflected light and transmitted light by the polarization beam splitter 30 correspondingly to the difference between the planes of polarization and converted into electric signals by light detectors 31 and 32, respectively.

Next, let the intensities of the eight kinds of light beams incident to the light detectors 22, 23, 31 and 32 be $K_1I_X\lambda_{1r}$, $K_2I_X\lambda_{2r}$, $K_3I_Y\lambda_{1r}$, $K_4I_Y\lambda_{2r}$, $K_5I_X\lambda_{1mY}$, $K_6I_X\lambda_{2mY}$, $K_7I_Y\lambda_{1mX}$ and $K_8I_Y\lambda_{2mX}$, respectively. Here, $K_1$ to $K_8$ are total transmission factors of light beams in a period of from the point of time when light beams are emitted by the laser oscillators 13 and 13' to the point of time when light beams enter the light detectors 22, 23, 31 and 32.

Next, the phases of the above-mentioned light beams (intensity: $K_1I_X\lambda_{1r}$ to $K_8I_Y\lambda_{2mX}$) when they are incident to the light detectors 22, 23, 31 and 32, respectively, will be described.

Let now the phase of reflected light $K_1I_X\lambda_{1r}$, the phase of reflected light $K_2I_X\lambda_{2r}$, the phase of reflected light $K_3I_Y\lambda_{1r}$, the phase of reflected light $K_4I_Y\lambda_{2r}$, the phase of reflected light $K_5I_X\lambda_{1mY}$, the phase of reflected light $K_6I_X\lambda_{2mY}$, the phase of reflected light $K_7I_Y\lambda_{1mX}$ and the phase of reflected light $K_8I_Y\lambda_{2mX}$ be $\phi_X\lambda_{1r}$, $\phi_X\lambda_{2r}$, $\phi_Y\lambda_{1r}$, $\phi_Y\lambda_{2r}$, $\phi_X\lambda_{1mY}$, $\phi_X\lambda_{2mY}$, $\phi_Y\lambda_{1mX}$ and $\phi_Y\lambda_{2mX}$, respectively, then the following expressions are obtained.

$$\phi_{X\lambda_{1r}} = \frac{2\pi n_X c l_C}{\lambda_1} + \frac{4\pi n_{XF} l_F}{\lambda_1} + \frac{4\lambda l_r}{\lambda_1} + \phi_{K1} \quad (3)$$

$$\phi_{X\lambda_{2r}} = \frac{2\pi n_X c l_C}{\lambda_2} + \frac{4\pi n_{XF} l_F}{\lambda_2} + \frac{4\lambda l_r}{\lambda_2} + \phi_{K2} \quad (4)$$

$$\phi_{Y\lambda_{1r}} = \frac{2\pi n_Y c l_C}{\lambda_1} + \frac{4\pi n_{YF} l_F}{\lambda_1} + \frac{4\lambda l_r}{\lambda_1} + \phi_{K3} \quad (5)$$

$$\phi_{Y\lambda_{2r}} = \frac{2\pi n_Y c l_C}{\lambda_2} + \frac{4\pi n_{YF} l_F}{\lambda_2} + \frac{4\lambda l_r}{\lambda_2} + \phi_{K4} \quad (6)$$

$$\phi_{X\lambda_{1mY}} = \frac{2\pi n_X c l_C}{\lambda_1} + \frac{2\pi n_{XF} l_F}{\lambda_1} + \frac{2\pi n_{YF} l_F}{\lambda_1} + \frac{4\pi l_r}{\lambda_1} + \frac{4\pi n l}{\lambda_1} + \phi_{K5} \quad (7)$$

$$\phi_{X\lambda_{2mY}} = \frac{2\pi n_X c l_C}{\lambda_2} + \frac{2\pi n_{XF} l_F}{\lambda_2} + \frac{2\pi n_{YF} l_F}{\lambda_2} + \frac{4\pi l_r}{\lambda_2} + \frac{4\pi n l}{\lambda_2} + \phi_{K6} \quad (8)$$

$$\phi_{Y\lambda_{1mX}} = \frac{2\pi n_Y c l_C}{\lambda_1} + \frac{2\pi n_{YF} l_F}{\lambda_1} + \frac{2\pi n_{XF} l_F}{\lambda_1} + \frac{4\pi l_r}{\lambda_1} + \frac{4\pi n l}{\lambda_1} + \phi_{K7} \quad (9)$$

$$\phi_{Y\lambda_{2mX}} = \frac{2\pi n_Y c l_C}{\lambda_2} + \frac{2\pi n_{YF} l_F}{\lambda_2} + \frac{2\pi n_{XF} l_F}{\lambda_2} + \frac{4\pi l_r}{\lambda_2} + \frac{4\pi n l}{\lambda_2} + \phi_{K8} \quad (10)$$

in which $l_C$: length of the electro-optical crystal 16, $l_F$: length of the polarization plane conserving optical fiber 6, $n_{XF}$: refractive index for light having a plane of polarization in the X-Z plane of the polarization plane conserving optical fiber 6, $n_{YF}$: refractive index for light having a plane of polarization in the Y-Z plane of the polarization plane conserving optical fiber 6, n: refractive index of liquid between the reference face 3 and the diaphragm 1, $l_r$: optical distance between the end face of the rod lens 7 and the reference face 3, l: distance between the reference face 3 and the diaphragm, $\phi_{K1}(\phi_{K3})$: total quantity of phase changes which are generated in light paths except the electro-optical crystal, the polarization plane conserving optical fiber and the pressure detector, in a period of from the point of time when a laser beam of wavelength $\lambda_1$ is emitted by the laser oscillator 13 to the point of time when the laser beam enters the light detector 22 (light detector 23).

$\phi_{K2}(\phi_{K4})$: total quantity of phase changes which are generated in light paths except the electro-optical crystal, the polarization plane conserving optical fiber and the pressure detector, in a period of from the point of time when a laser beam of wavelength $\lambda_2$ is emitted by the laser oscillator 13' to the point of time when the laser beam enters the light detector 31 (light detector 32).

$\phi_{K5}(\phi_{K7})$: total quantity of phase changes which are generated in light paths except the electro-optical crystal, the polarization plane conserving optical fiber and the pressure detector, in a period of from the point of time when a laser beam of wavelength $\lambda_2$ is emitted by the laser oscillator to the point of time when the laser beam enters the light detector 31 (light detector 32).

$\phi_{K6}(\phi_{K8})$: total quantity of phase changes which are generated in light paths except the electro-optical crystal, the polarization plane conserving optical fiber and the pressure detector, in a period of from the point of time when a laser beam of wavelength $\lambda_2$ is emitted by the laser oscillator to the point of time when the laser beam enters the light detector 32 (light detector 31).

From the aforementioned results, the following expression is obtained.

$$\phi_{K1} = \phi_{K7}, \quad \phi_{K2} = \phi_{K8}, \quad \phi_{K3} = \phi_{K5}, \quad \phi_{K4} = \phi_{K6} \quad (11)$$

Next, the brightness of light incident to each of the light detectors 22, 23, 31 and 32 will be described.

Light beams $K_1I_X\lambda_{1r}$ and $K_7I_Y\lambda_{1mX}$ enter the light detector 22. Let the phase difference between the light beams be $\phi_X\lambda_1$ with reference to the light beam $I_X\lambda_{1r}$ reflected by the reference face 3 of the pressure detector 100, then the following expression is obtained.

$$\begin{aligned}\phi_{X\lambda_1} = \phi_{Y\lambda_{1mX}} - \phi_{X\lambda_{1r}} &= \frac{2\pi l_C}{\lambda_1}(n_{YC} - n_{XC}) + \\ &\quad \frac{2\pi l_F}{\lambda_1}(n_{YF} - n_{XF}) + \frac{4\pi n l}{\lambda_1} \\ &= \frac{2\pi l_C}{\lambda_1}\{n_{YOC} - n_{XOC} + (K_{YC} - K_{XC})e\} + \\ &\quad \frac{2\pi l_F}{\lambda_1}(n_{YF} - n_{XF}) + \frac{4\pi n l}{\lambda_1} \\ &= \Delta\phi_{CO\lambda_1} + \Delta\phi_{C\kappa\lambda_1} + \Delta\phi_{F\lambda_1} + \phi_m\end{aligned} \quad (12)$$

in which $$\left.\begin{aligned}\frac{2\pi l_C}{\lambda_1}(n_{YOC} - n_{XOC}) &= \Delta\phi_{CO\lambda_1} \\ \frac{2\pi l_C}{\lambda_1}(K_{YC} - K_{XC}) &= \Delta\phi_{C\kappa\lambda_1} \\ \frac{2\pi l_F}{\lambda_1}(n_{YF} - n_{XF}) &= \Delta\phi_{F\lambda_1} \\ \frac{1\pi n l}{\lambda_1} &= \phi_m\end{aligned}\right\} \quad (13)$$

Accordingly, let the brightness of interference light be $I_X\lambda_1$, then the following expression is obtained.

$$I_{X\lambda_1} = K_1 I_{X\lambda_{1r}} + K_7 I_{Y\lambda_{1mX}} + 2\sqrt{K_1 K_7 I_{X\lambda_{1r}} \cdot I_{Y\lambda_{1mX}}}\cos\phi_{X\lambda_1} \quad (14)$$

When the electro-optical crystal 16 is now driven by the high frequency electric source 15, the brightness $I_X\lambda_1$ of interference light given by the expression (14) changes with the change of $\phi_X\lambda_1$. When the brightness $I_X\lambda_1$ of interference light is converted into an electric signal by the light detector 23, the brightness $I_X\lambda_1$ of interference light takes its maximum value in the case of $\phi_X\lambda_1 = 2\pi N$.

The brightness $I_x\lambda_1$ of interference light is detected by the maximum value detection circuit 24 in a moment when the brightness of interference light takes its maximum value, so that a voltage $e_x\lambda_1$ applied to the electro-optical crystal 16 in this moment is detected by the sample-hold circuit 26 and stored in the sample-hold circuit 26.

$$e_{X\lambda 1} = \frac{1}{\phi_{CK\lambda 1}} (2\pi N - \Delta\phi_{CO\lambda 1} - \Delta\phi_{F\lambda 1} - \phi_m) \quad (15)$$

Similarly, two light beams $K_3 I_y \lambda_{1r}$ and $K_5 I_x \lambda_{1mY}$ enter the light detector 23 and interfere with each other. Let the phase difference between the two light beams be $\phi_y \lambda_1$, then the following expression is obtained.

$$\begin{aligned}\phi_{Y\lambda 1} &= \frac{2\pi l_C}{\lambda_1}(n_{XC}-n_{YC}) + \frac{2\pi l_F}{\lambda_1}(n_{XF}-n_{YF}) + \frac{4\pi n l}{\lambda_1} \quad (16)\\ &= \frac{2\pi l_C}{\lambda_1}\{n_{XOC}-n_{YOC}+(K_{XC}-K_{YC})e\} + \\ &\quad \frac{2\pi l_F}{\lambda_1}(n_{XF}-n_{YF}) + \frac{4\pi n l}{\lambda_1}\\ &= -\Delta\phi_{CO\lambda 1} - \Delta\phi_{CK\lambda 1} e - \Delta\phi_{F\lambda 1} + \phi_m\end{aligned}$$

Let the brightness of interference light be $I_y\lambda_1$. When the brightness $I_y\lambda_1$ of interference light is converted into an electric signal by the light detector 23, the brightness $I_y\lambda_1$ takes its maximum value in the case where the phase difference between the two light beams has the relation $\phi_y\lambda_1 = 2\pi N$. The brightness of interference light is detected by the maximum value detection circuit 25 in a moment when the brightness of interference light takes its maximum value, so that a voltage applied to the electro-optical crystal in this moment is detected by the sample-hold circuit 27 and stored in the sample-hold circuit 27. Let the voltage be $e_y\lambda_1$, the following expression is obtained.

$$e_{Y\lambda 1} = \frac{1}{\phi_{CK\lambda 1}} (-2\pi N - \Delta\phi_{CO\lambda 1} - \Delta\phi_{F\lambda 1} + \phi_m) \quad (17)$$

The difference between the voltages $e_y\lambda_1$ (see the expression (17)) and $eX_y\lambda_1$ (see the expression (15)) is calculated by the subtraction circuit 28. Let the difference voltage be $e\lambda_1$, then the following expression is obtained.

$$e_{\lambda 1} = e_{Y\lambda 1} - e_{X\lambda 1} = \frac{1}{\phi_{CK\lambda 1}} (2\phi_m - 4\pi N) \quad (18)$$

Because $\phi_{CK}\lambda_1$ expresses the phase difference in the case where a unit voltage is applied to the electro-optical crystal 16, the following expression is obtained when the voltage required for producing the phase difference of $2\pi$ rad in the electro-optical crystal 16 is replaced by $V\lambda_1$.

$$\phi_{CK\lambda 1} \cdot V_{\lambda 1/2} = \pi \quad \phi_{CK\lambda 1} = \frac{\pi}{V_{\lambda 1/2}} \quad (19)$$

When the expressions (19) and (13) are substituted into the expression (18), the following expression is obtained.

$$\begin{aligned}e_{\lambda 1} &= \frac{V_{\lambda 1/2}}{\pi}(2\phi_m - 4\pi N) \quad (20)\\ &= \frac{V_{\lambda 1/2}}{\pi}\left(\frac{8\pi n l}{\lambda_1} - 4\pi N\right)\\ &= 4V_{\lambda 1/2}\left(\frac{2nl}{\lambda_1} - N\right)\end{aligned}$$

The output voltage $e\lambda_2$ of the subtraction circuit 37 is given by the following expression in the same manner as described above.

$$e_{\lambda 2} = 4V_{\lambda 2/2}\left(\frac{2nl}{\lambda_2} - N\right) \quad (21)$$

$$\frac{V_{\lambda 1/2}}{\lambda_1} = \frac{V_{\lambda 2/2}}{\lambda_2} \quad V_{\lambda 2/2} = \frac{\lambda_2}{\lambda_1} V_{\lambda 1/2} \quad (22)$$

When the expression (22) is substituted into the expression (21), the following expression is obtained.

$$e_{\lambda 2} = 4\frac{\lambda_2}{\lambda_1} V_{\lambda 1}\left(\frac{2nl}{\lambda_2} - N\right) \quad (23)$$

Figure 4:
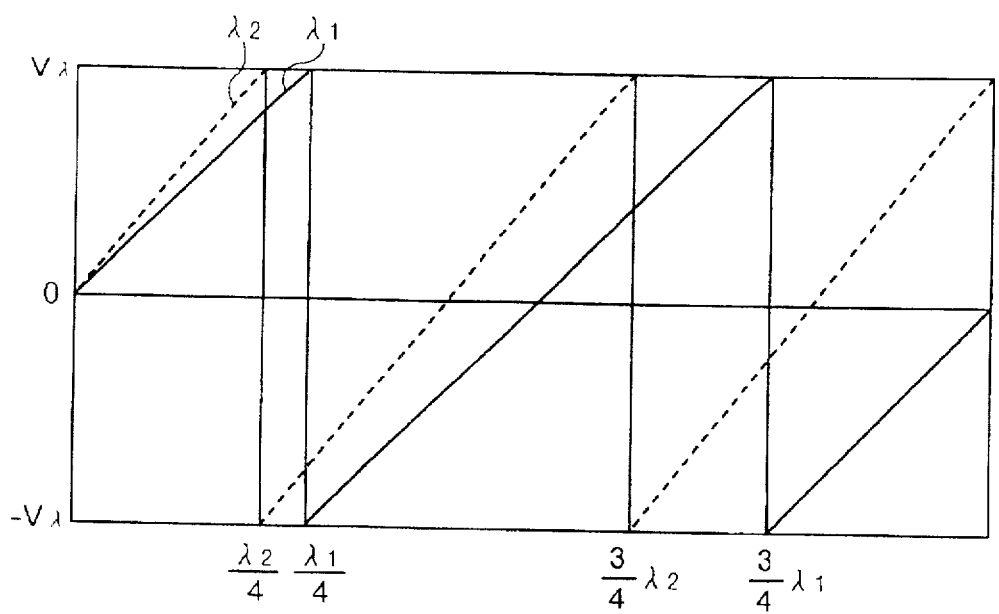
FIG. 4 is a characteristic graph showing the operation of the electro-optical crystal constituting the embodiment of the measurement apparatus according to the present invention and depicted in FIG. 3.

Assuming now for simplification's sake that the voltages $e\lambda_1$ and $e\lambda_2$ have the relations $e\lambda_1 = e\lambda_2 = 0$ in the expressions (20) and (23) and the voltage applied to the electro-optical crystal 16 is $\pm V\lambda_{/2}$ ($\pm V\lambda_{/2}$ is a half-wavelength voltage defined by reference wavelength $\lambda$) when the distance 1 between the reference face 3 and the diaphragm 1 is zero (l=0), then the relations between the distance 1 and the voltages $e\lambda_1$ and $e\lambda_2$ are as shown in FIG. 4.

Incidentally, the relations of half-wavelength voltages $V\lambda_{1/2}$ and $V\lambda_{2/2}$ with wavelengths $\lambda_1$ and $\lambda_2$ are given by the following expressions.

$$V_{\lambda 1/2} = \frac{\lambda_1}{\lambda} V_{\lambda/2}, \quad V_{\lambda 2/2} = \frac{\lambda_2}{\lambda} V_{\lambda/2} \quad (24)$$

In FIG. 4, when the number of times by which the voltage $e\lambda_1$ changes discontinuously and the number of times by which the voltage $e\lambda_2$ changes discontinuously are $N_1$ and $N_2$, respectively, the relation $N_1=N_2(=N)$ holds in the range (1) of $e\lambda_1 < e\lambda_2$.

Accordingly, the following expression is obtained from the expression (20).

$$l = \frac{\lambda_1 e_{\lambda 1}}{8nV_{\lambda 1/2}} + \frac{\lambda_1 N_1}{2n} \quad (25)$$

From the expression (23), the following expression is obtained.

$$l = \frac{\lambda_1 e_{\lambda 2}}{8nV_{\lambda 1/2}} + \frac{\lambda_2 N_2}{2n} \quad (26)$$

When the equation $\lambda_1 = \lambda_2 + \Delta\lambda$ is substituted into the expressions (25) and (26), $N_1$ is given by the following expression.

$$N_1 = \frac{\lambda_1}{4\Delta\lambda V_{\lambda 1/2}} (e_{\lambda 2} - e_{\lambda 1}) \quad (27)$$

When $N_1$ satisfying the condition in which $N_1$ is a positive integer is calculated from the expression (27) independently and substituted into the expression (25), the distance 1 is obtained.

Further, when the expression (27) is substituted into the expression (25) directly, the following expression is obtained.

$$l = \frac{\lambda_1}{8nV_{\lambda 1/2}} \left\{ e_{\lambda 1} + \frac{\lambda_1}{\Delta\lambda}(e_{\lambda 2} - e_{\lambda 1}) \right\} \quad (28)$$

The distance 1 can be also calculated from the expression (28).

In the range (2) of $e\lambda_1 > e\lambda_2$ in which the relation $N_2 = N_1 + 1$ holds, $N_1$ is given by the following expression.

$$N_1 = \frac{\lambda_2}{\Delta\lambda} - \frac{\lambda_1(e_{\lambda 1} - e_{\lambda 2})}{4\Delta\lambda V_{\lambda 1/2}} \quad (29)$$

When $N_1$ satisfying the condition in which $N_1$ is a positive integer is calculated from the expression (29) independently and substituted into the expression (25), the distance 1 is obtained. Further, when the expression (29) is substituted into the expression (25) directly, the following expression is obtained.

$$l = \frac{\lambda_1}{8nV_{\lambda 1/2}} \left\{ e_{\lambda 1} + \frac{4\lambda_2 V_{\lambda 1/2} - \lambda_1(e_{\lambda 1} - e_{\lambda 2})}{\Delta \lambda} \right\} \quad (30)$$

The distance 1 can be also calculated from the expression (30).

The aforementioned first arithmetic operation circuit 38 calculates $N_1$ in accordance with the expressions (27) and (29). On the basis of the arithmetic operation result obtained by the first arithmetic operation circuit 38, the second arithmetic operation circuit 39 calculates the distance 1 in accordance with the expression (25) and calculates pressure acting on the diaphragm 1 on the basis of the distance 1 thus calculated.

Although the above description has been made upon the case where $N_1$ is calculated independently so that the distance is obtained from the expression (25), the invention can be applied to the case where voltages $e\lambda_1$ and $e\lambda_2$ are introduced into the expressions (28) and (30) directly so that not only the distance 1 can be calculated but also pressure acting on the diaphragm 1 can be calculated on the basis of the calculated distance 1.

Although the above description has been made upon the case where the brightness of the interference signal is detected in a moment when the brightness takes its maximum value, the same measurement can be made in the case where the brightness of the interference signal is detected in a moment when the brightness takes its minimum value.

In this embodiment, the quantity of displacement of the diaphragm 1 and a pressure or difference pressure acting on the diaphragm 1 can be measured without any influence on measurement accuracy even in the case where the refractive index of the polarization plane conserving optical fiber changes correspondingly to the change of ambient temperature, the action of mechanical external force, or the like. Further, by using two linearly polarized laser beams of different wavelengths, the range of measurement can be widened. As a result, not only the physical quantity of a subject to be measured can be measured accurately even in the case where the range of measurement changes widely, but also the physical quantity, such as displacement, or the like, of a subject to be measured located in a remote place can be measured by using a small-sized detector and an optical fiber.

Figure 5:
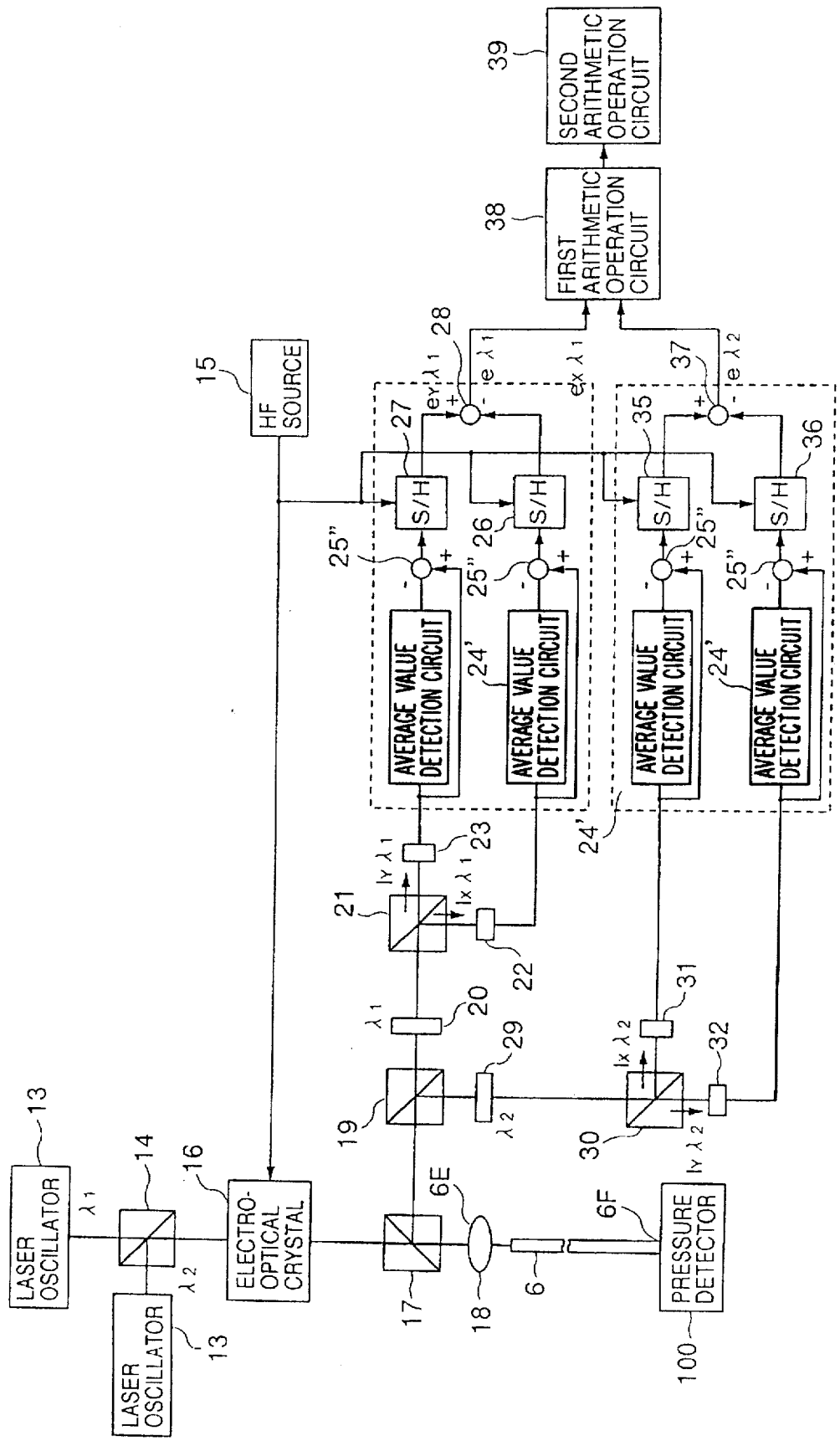
FIG. 5 is a configuration diagram showing another embodiment of the measurement apparatus according to the present invention.

FIG. 5 shows another embodiment of the measurement apparatus according to the present invention. Like numerals in each of FIGS. 2 and 5 refer to like parts. In FIG. 5, the configuration of parts up to the light detectors 22, 23, 31 and 32 by which electric signals are obtained is the same as that shown in FIG. 2, so that the description thereof will be omitted. Let the brightness of interference light incident to the light detector 22 be $I_x\lambda_1$, then the brightness $I_x\lambda_1$ of interference light is given by the expression (14). The brightness is converted into an electric signal, so that a voltage equivalent to the average of maximum and minimum values of the brightness $I_x\lambda_1$ of interference light is obtained by an average value detection circuit 24'. When this voltage and the output voltage of the light detector 22 are subtracted from each other by a subtractor 25", a voltage equivalent to the change of the brightness is obtained as shown in the expression (14). The voltage applied to the electro-optical crystal in a moment when the output voltage of the subtractor 25" crosses at a zero point is stored in a sample-hold circuit 26.

When output voltages of subtraction circuits 28 and 37 are calculated on the basis of voltages stored in sample-hold circuits 27, 35 and 36 in the same manner as described above, expressions formed by substituting ((N/2)+(¼)) for N in the expressions (20) and (21) in the previous embodiment shown in FIG. 2 are obtained.

Accordingly, hereafter, the quantity of displacement of the diaphragm 1 and pressure acting on the diaphragm 1 can be obtained by the same operation as in the previous embodiment shown in FIG. 2.

In this embodiment, the same effect as in the previous embodiment can be obtained.

Figure 6:
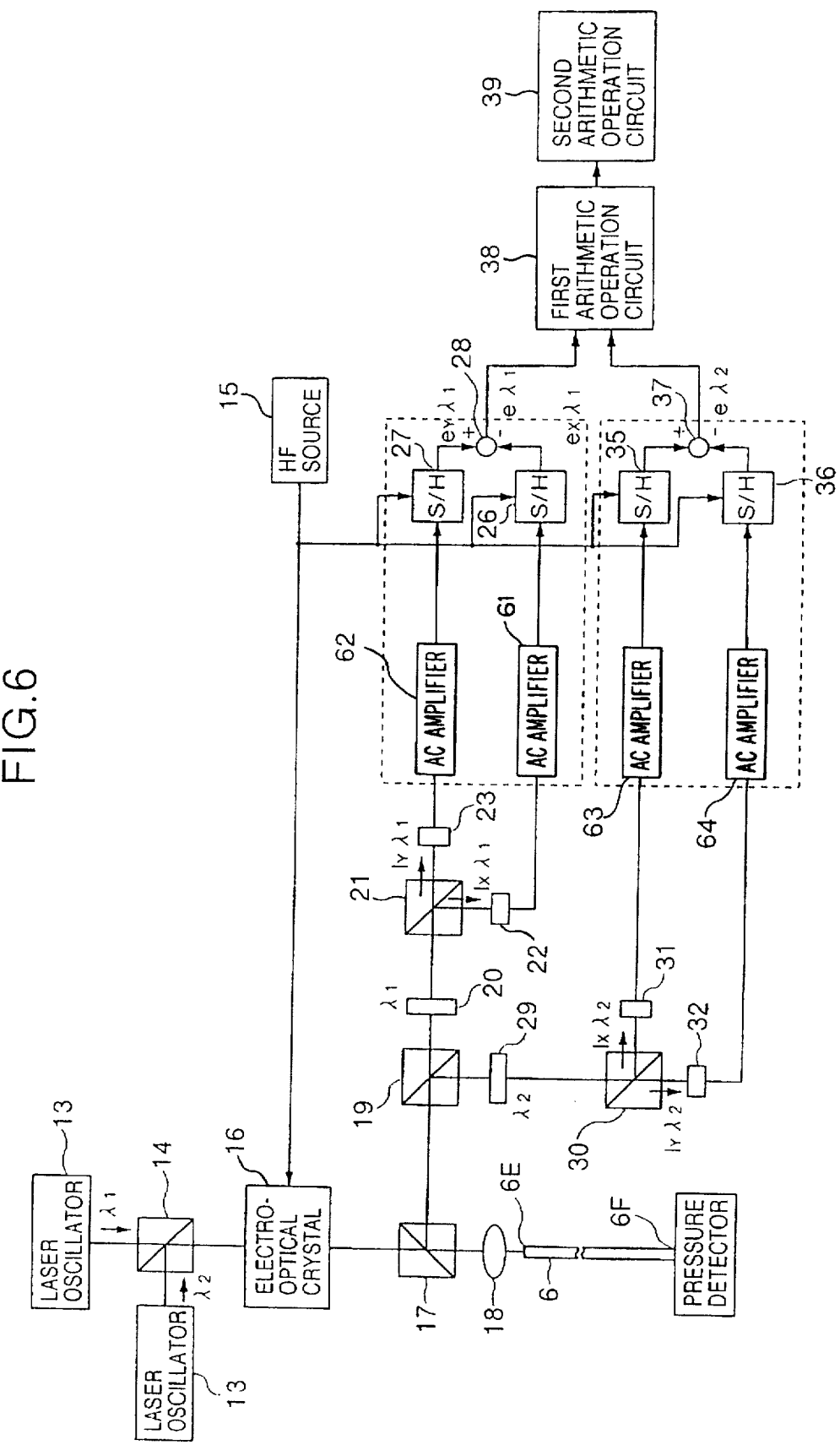
FIG. 6 is a configuration diagram showing a further embodiment of the measurement apparatus according to the present invention.

FIG. 6 shows a further embodiment of the measurement apparatus according to the present invention. Like numerals in each of FIGS. 2 and 6 refer to like parts. The point of the difference between the embodiment shown in FIG. 6 and the embodiment shown in FIG. 2 is in that the maximum (or minimum) value detection circuits 24, 25, 33 and 34 in FIG. 2 are replaced by AC amplifiers 61, 62, 63 and 64 in FIG. 6.

In FIG. 6, the phase difference between two light beams incident to the light detector 22 is given by the expression (12) as explained above. Next, the size of the voltage applied to the electro-optical crystal 16 will be described.

When the following expression $$\Delta\phi_{CE\lambda 1}e = A \sin\omega t \quad (31)$$

is substituted into the expression (12), the following expression is obtained.

$$\cos\phi_{x\lambda 1} = \cos(\Delta\phi_{CO\lambda 1} + \Delta\phi_{F\lambda 1} + \phi_m + A\sin\omega t) = \cos(\Delta\phi_{CO\lambda 1} + \Delta\phi_{F\lambda 1} + \phi_m)\cdot\cos(A\sin\omega t) - \sin(\Delta\phi_{CO\lambda 1} + \Delta\phi_{F\lambda 1} + \phi_m)\cdot\sin(A\sin\omega t) \quad (32)$$

The values of $\cos(A\sin\omega t)$ and $\sin(A\sin\omega t)$ are given by the following expressions with use of Bessel function Jn.

$$\cos(A\sin\omega t) = J_0(A) + 2\sum_{n=1}^{\infty} J_{2n}(A)\cos(2n\omega t) \quad (33)$$

$$\sin(A\sin\omega t) = 2\sum_{n=1}^{\infty} J_{2n-1}(A)\cos(2n-1)\omega t$$

When the expressions (33) are substituted into the expression (32), the following expression is obtained.

$$\cos\phi_{x\lambda 1} = \cos(\Delta\phi_{CO\lambda 1} + \Delta\phi_{F\lambda 1} + \phi_m)J_0(A) + \quad (34)$$

$$2\cos(\Delta\phi_{CO\lambda 1} + \Delta\phi_{F\lambda 1} + \phi_m)\sum_{n=1}^{\infty} J_{2n}(A)\cos(2n\omega t) -$$

$$2\sin(\Delta\phi_{CO\lambda 1} + \Delta\phi_{F\lambda 1} + \phi_m)\sum_{n=1}^{\infty} J_{2n-1}(A)\cos(2n-1)\omega t$$

From the condition of $J_0(A)=0$, that is, $A=2.4$ in the expression (34), the following expression is obtained.

$$e = \frac{2\cdot 4\lambda_1}{2\pi d_c(K_{YC} - K_{XC})} \sin\omega t \quad (35)$$

When the voltage shown in the expression (35) is applied to the electro-optical crystal 16, the first term in the expression (34) becomes equal to zero, so that the brightness of interference light changes at frequencies containing the frequency ω of the voltage applied to the electro-optical crystal and containing integral multiples of the frequency ω.

Accordingly, in this embodiment, the maximum (or minimum) value detection circuits 24, 25, 33 and 34 shown in FIG. 2 can be replaced by AC amplifiers 61 to 64. Voltages each applied to the electro-optical crystal in a moment when the output voltage of each of the AC amplifiers 61 to 64 crosses at a zero point are stored in the sample-hold circuits 26, 27, 35 and 36. Hereafter, the displacement of the diaphragm 1 and a pressure difference between opposite sides of the diaphragm 1 can be measured by the same operation as in the previous embodiment shown in FIG. 2.

If the voltage applied to the electro-optical crystal is adjusted here so that the expression (35) holds with respect to wavelength $\lambda_1$, error arises with respect to light of wavelength $\lambda_2$ but the error is small because of $\lambda_1 \approx \lambda_2$.

If the voltage shown in the expression (35) is applied to the electro-optical crystal 16, light incident to the crystal 16 is phase-modulated by phase component $\Delta\phi$ which is represented by $A\sin\omega t$ in which A is the amplitude satisfying $Jo(A)=0$, and $\omega$ is the frequency of the applied voltage as the phase.

Accordingly, the order number N (integer) is first calculated in accordance with the expression (27) or (29) on the basis of measured values for wavelengths $\lambda_1$ and $\lambda_2$. Because of the condition in which N is an integer, the number N can be obtained accurately without any influence of the error on the measured value for wavelength $\lambda_2$. Thereafter, not only the displacement of the diaphragm 1 and pressure acting on the diaphragm 1 can be measured accurately in accordance with the expression (25) by using the accurately measured value for wavelength $\lambda_1$ and the number N but also the same effect as in the previous embodiment can be obtained.

Figure 7:
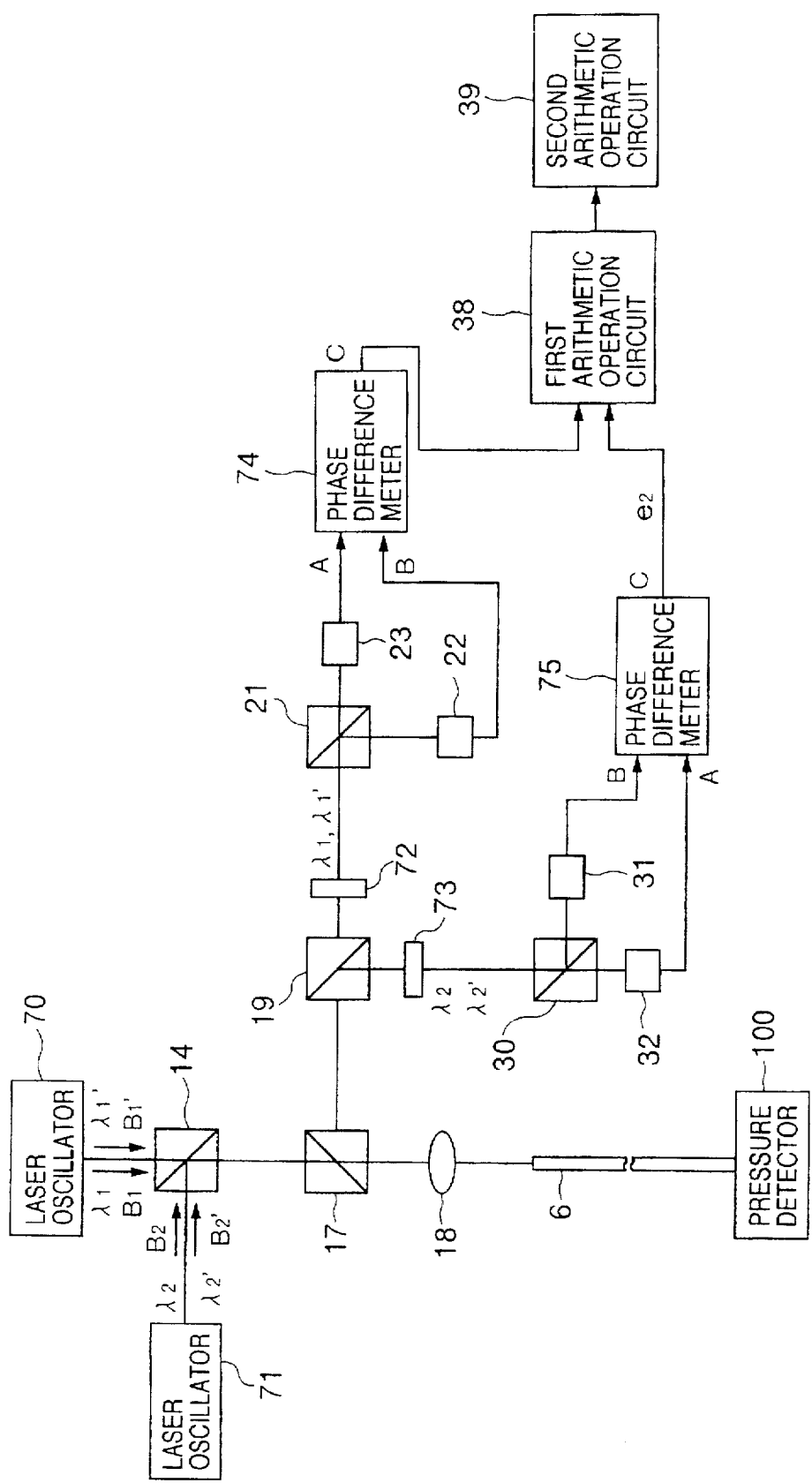
FIG. 7 is a configuration diagram showing a further embodiment of the measurement apparatus according to the present invention.

FIG. 7 shows a further embodiment of the measurement apparatus according to the present invention. Like numerals in each of FIGS. 2 and 7 refer to like parts. In FIG. 7, the reference numerals 70 and 71 designate orthogonal bipolarization laser oscillators. These orthogonal bipolarization laser oscillators 70 and 71 emit light beams $B_1$ (wavelength: $\lambda_1$, plane of polarization: X direction) and $B_1'$ (wavelength: $\lambda_1'$, plane of polarization: Y direction) slightly different in frequency and having planes of polarization intersecting each other perpendicularly and emit light beams $B_2$ (wavelength: $\lambda_2$, plane of polarization: X direction) and $B_2'$ (wavelength: $\lambda_2'$, plane of polarization: Y direction) slightly different in frequency and having planes of polarization intersecting each other perpendicularly, respectively.

Here, $\lambda_1$, $\lambda_1'$, $\lambda_2$ and $\lambda_2'$ are considered to have the relations shown in the following expression (36).

$$|\lambda_1 - \lambda_1'|, |\lambda_2 - \lambda_2'| \ll |\lambda_1 - \lambda_2| \ll \lambda_1, \lambda_2 \quad (36)$$

The reference numerals 72 and 73 designate interference filters each of which permits selected one of light beams of wavelengths $\lambda_1$, $\lambda_1'$, $\lambda_2$ and $\lambda_2'$ to pass through. The reference numerals 74 and 75 designate phase difference meters each of which outputs (phase of light given to a terminal B)−(phase of light given to a terminal A) in an output range of $\pm\pi$ at a terminal C.

In this embodiment, like the embodiment shown in FIG. 2, there is obtained a phase difference which is produced in a period in which light emitted from the orthogonal bipolarization laser oscillator 70 reaches the pressure detector 100 through the polarization plane conserving optical fiber 6, is reflected here, goes back again through the polarization plane conserving optical fiber 6 and reaches the polarization beam splitter 21 via the beam splitters 17 and 19 and the interference filter 72.

Incidentally, approximate calculation is made by using the relation given by the expression (36). The phase difference $\phi_X\lambda_1$ between light beams $B_1$ and $B_1'$ contained in components vibrating in the X direction is given by the following expression (37) using symbols equivalent to those used in the expression (12) (the phase of light beam $B_1'$ is delayed by $\phi_X\lambda_1$ from the phase of light beam $B_1$).

$$\phi_{X\lambda 1} = \frac{2\pi l_F}{\lambda_1}(n_{YF} - n_{XF}) + \frac{4\pi nl}{\lambda_1} \quad (37)$$

That is, a beat signal $e_X\lambda_1$ detected by the light detector 22 is given by the following expression (38).

$$e_{X\lambda 1} = \cos(\Delta\omega_1' t - \phi_{X\lambda 1})\Delta\omega_1' = \frac{2\pi c}{\lambda_1'} - \frac{2\pi c}{\lambda_1} \quad (38)$$

Similarly, the phase difference $\phi_Y\lambda_1$ between light beams $B_1$ and $B_1'$ contained in components vibrating in the Y direction is given by the following expression (39) (the phase of light beam $B_1$ is delayed by $\phi_Y\lambda_1$ from the phase of light beam $B_1'$).

$$\phi_{Y\lambda 1} = \frac{2\pi l_F}{\lambda_1}(n_{XF} - n_{YF}) + \frac{4\pi nl}{\lambda_1} \quad (39)$$

A beat signal $e_Y\lambda_1$ detected by the light detector 23 is given by the following expression (40).

$$e_{Y\lambda 1} = \cos(\Delta\omega_1 t - \phi_{Y\lambda 1}) = \cos(\Delta\omega_1' t + \phi_{Y\lambda 1}) \quad (40)$$

$$\Delta\omega_1 = \frac{2\pi c}{\lambda_1} - \frac{2\pi c}{\lambda_1'} = -\Delta\omega_1'$$

Accordingly, the output $e_1$ of the phase difference meter 74 is given by the expression (41).

$$e_1 = \phi_{Y\lambda 1} - (-\phi_{X\lambda 1}) = \frac{8\pi nl}{\lambda_1} \quad (41)$$

Considering similarly the phase change of light in a period of from the point of time when light is emitted from the orthogonal bipolarization laser oscillator 71 to the point of time when light reaches the polarization beam splitter 30, beat signals $e_X\lambda_2$ and $e_Y\lambda_2$ detected by the light detectors 31, 32 and the output $e_2$ of the phase difference meter 75 are given by the expressions (42), (43) and (44), respectively.

$$e_{X\lambda 2} = \cos(\Delta\omega_2' t - \phi_{X\lambda 2}) \quad (42)$$

in which $$\phi_{X\lambda 2} = \frac{2\pi l_F}{\lambda_2}(n_{YF} - n_{XF}) + \frac{4\pi nl}{\lambda_2} \quad (43)$$

$$\Delta\omega_2' = \frac{2\pi c}{\lambda_2'} - \frac{2\pi c}{\lambda_2}$$

$$e_{Y\lambda 2} = \cos(\Delta\omega_2' t + \phi_{Y\lambda 2})$$

in which $$\phi_{Y\lambda 2} = \frac{2\pi l_F}{\lambda_2}(n_{XF} - n_{YF}) + \frac{4\pi nl}{\lambda_2} \quad (44)$$

$$e_2 = \frac{8\pi nl}{\lambda_2}$$

From the above description, the distance between the diaphragm 1 of the pressure detector 100 and the reference face 3 can be obtained on the basis of the outputs $e_1$ and $e_2$ of the phase difference meters 74 and 75 in the same manner as in the embodiment of FIG. 2, so that the displacement of the diaphragm 1 and pressure acting on the diaphragm 1 can be measured.

In this embodiment, the same effect as in the previous embodiment can be obtained.

Figure 8:
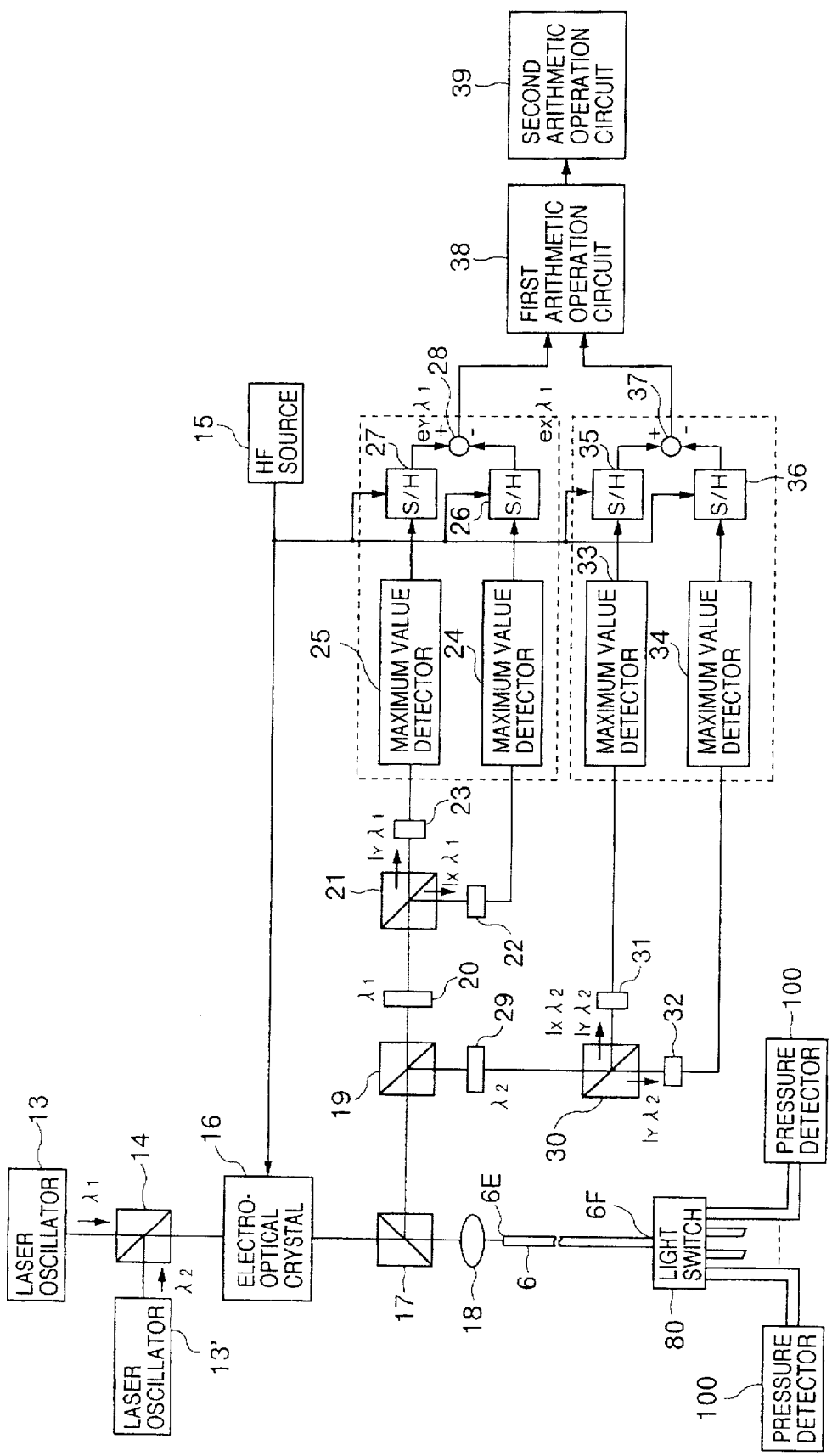
FIG. 8 is a configuration diagram showing a further embodiment of the measurement apparatus according to the present invention.

FIG. 8 shows a further embodiment of the measurement apparatus according to the present invention. Like numerals in each of FIGS. 2 and 8 refer to like parts. In this embodiment, a light switch 80 is provided in the polarization plane conserving optical fiber 6 so that a plurality of pressure detectors 100 are connected to the light switch 80.

In this embodiment, not only the same effect as in the previous embodiment can be obtained but also quantities of state can be measured at a plurality of measurement points in a plant as long as the plurality of measurement points are selected by the light switch 80.

Incidentally, the above-mentioned light switch 80 may be applied to the embodiments shown in FIGS. 5 through 7.

Figure 9:
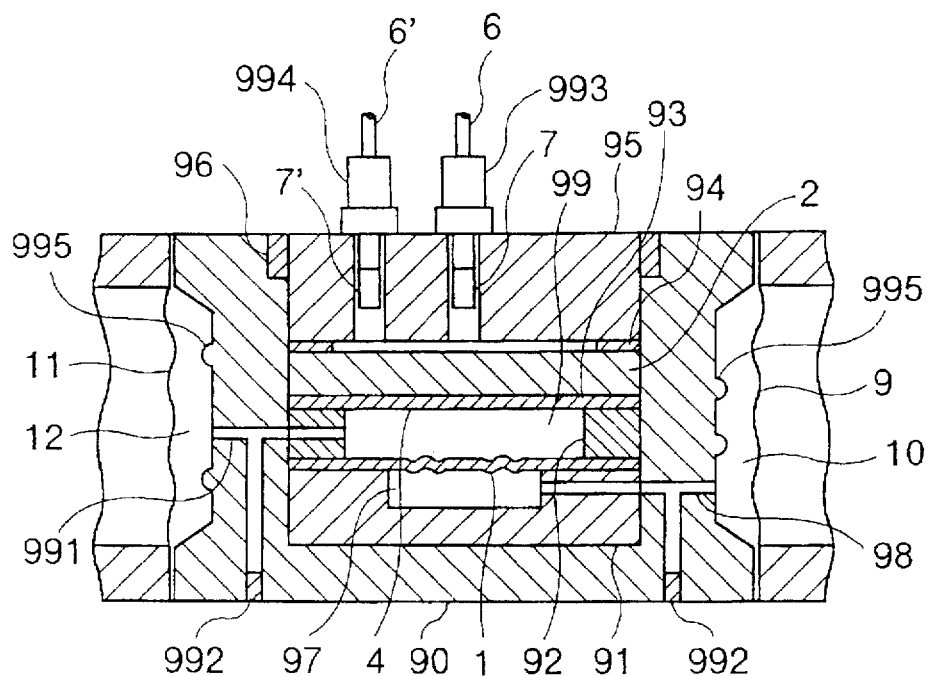
FIG. 9 is a vertical sectional view showing another example of the detector used in the measurement apparatus according to the present invention.

FIG. 9 shows a further embodiment of the pressure detector used in the measurement apparatus according to the present invention. Like numerals in each of FIGS. 1 and 9 refer to like parts. In FIG. 9, a base 91 welded with a diaphragm 1 for detection, a spacer 92, glass 2 provided with a ¼ wavelength plate 4 and a semipermeable film 93 formed by vapor deposition, a packing 94 and a stopper 95 are inserted into the center portion of a body or frame 90 successively and fixed as a whole to the body 90 by a metal 96 finally.

The left side of a seal diaphragm 9 and a pressure chamber 97 are made to communicate with each other through a duct 98. This space is filled with a liquid 10. Similarly, the right side space of a seal diaphragm 11 and a pressure chamber 99 are made to communicate with each other through a duct 991. This space is filled with a liquid 12. For example, these liquids may be set up as follows. After stoppers 992 are pulled out and then the whole is evacuated, the liquids are injected into the ducts and finally stoppers 22 and 23 are inserted.

Pressure to be measured is applied to the seal diaphragms 9 and 11, so that the diaphragm 1 for detection is transformed proportionally to the pressure difference. Polarization plane conserving optical fibers 6 and 6' having rod lenses 7 and 7' at their ends, respectively, are fixed to the stopper 95 through connectors 993 and 994, respectively. Laser beams propagated in the polarization plane conserving optical fibers 6 and 6', respectively, are collimated by the rod lenses 7 and 7', so that the laser beams are outputted as collimated light beams. Part of the laser beams are reflected by the semipermeable film 93 so as to go back to the optical fibers 6 and 6', respectively. The residual part of the laser beams pass through the ¼ wavelength plate 4 and the liquid 12 and is reflected by the surface of the diaphragm 1 for detection so as to go back to the optical fibers 6 and 6', respectively.

In this embodiment, the displacement of the detection diaphragm 1, that is, the difference between the high pressure side pressure $P_h$ and the low pressure side pressure $P_L$ can be measured as long as light returning to the optical fiber 6 is measured by reference to the semipermeable film 93. Similarly, the change of the refractive index of the liquid 12 can be measured correspondingly to the high pressure side pressure $P_h$ and temperature as long as light returning to the optical fiber 6' is measured. If the result of measurement of a pressure difference is corrected on the basis of the result of measurement of the change of refractive index as occasion demands, a pressure difference can be measured accurately. This correction method has an advantage in that even in the case where not only the refractive index of the liquid 12 changes but also the thickness of the spacer 92 changes corresponding to temperature, the influence thereof can be eliminated.

Next, a protecting mechanism in the case where excessive pressure is applied to the high pressure side or the low pressure side will be described. When an excessive amount of pressure not smaller than the rating value is applied to the pressure detector 100 shown in FIG. 9, pressure in the pressure chambers 97 and 99 increases until the seal diaphragms 9 and 11 strike on the stopper 995 formed on the surface of the body 90. As a result, there is a risk of destruction of the detection diaphragm 1. In the case where only the high pressure side pressure Ph is applied so that the low pressure side pressure is zero, the relation between the high pressure side pressure $P_h$ and the displacement of the seal diaphragm 11 is determined on the basis of the stiffness of the detection diaphragm 1. Accordingly, if an upper limit of pressure in the pressure chamber 99 is decided and the stiffness of the detection diaphragm 1 is designed so that the seal diaphragm 11 strikes on the stopper 995 when the high pressure side pressure $P_h$ reaches the upper limit, the pressure of the pressure chamber 99 is prevented from exceeding the upper limit even in the case where an excessive amount of pressure not smaller than the upper limit is applied thereto.

Further, by forming the low pressure side in the same manner as described above, the pressure of the pressure chamber 18 is prevented from exceeding the upper limit even in the case where an excessive amount of pressure is applied to the low pressure side.

The detection diaphragm 1 of the pressure detector 100 serves as an element for protection from excessive pressure and also serves as a conversion element for measurement of a pressure difference, so that there arises an advantage in that the whole structure of the pressure detector is simplified.

Incidentally, if the pressure detector shown in FIG. 9 is designed so that the low pressure side is opened to the air, the pressure detector can be used for detecting the high pressure side pressure. Further, when a material small in coefficient of linear expansion is used as the material for the spacer 92, the static pressure of the high pressure side pressure can be measured on the basis of the change of the refractive index of the liquid 12 as long as light returning to the optical fiber 6' is measured.

Figure 10:
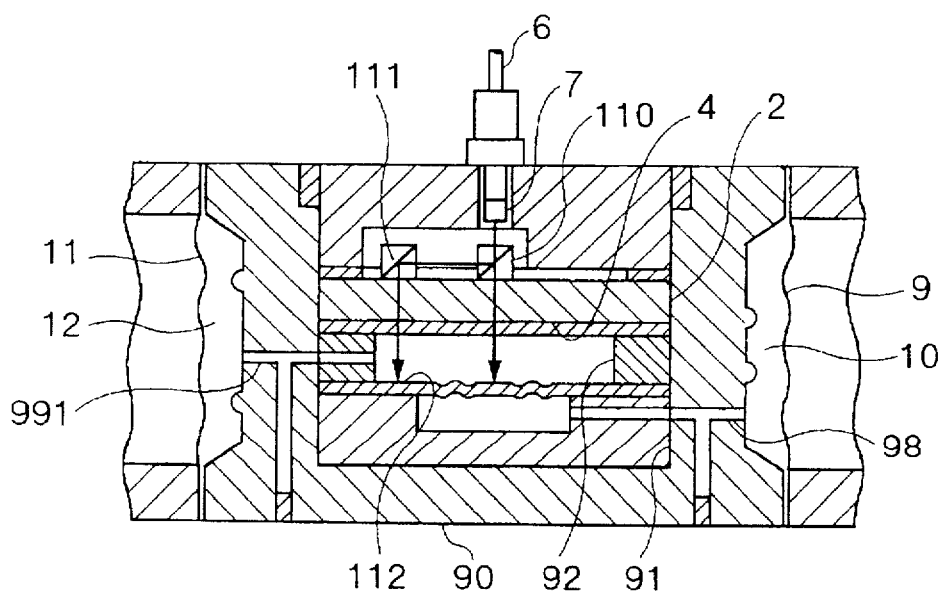
FIG. 10 is a vertical sectional view showing a further example of the detector used in the measurement apparatus according to the present invention.

FIG. 10 shows a further embodiment of the differential pressure detector used in the measurement apparatus according to the present invention. Like numerals in each of FIGS. 9 and 10 refer to like parts. In this embodiment, laser light outputted from the rod lens 7 is split into reflected light and transmitted light by a beam splitter 110. The reflected light is reflected by a mirror 111 and then enters a reference face 112. The light is reflected by the reference face 112 so as to go back to the polarization plane conserving optical fiber 6. On the other hand, the light transmitted through the beam splitter 110 is reflected by the surface of the detection diaphragm 1 so as to go back to the optical fiber 6.

In this embodiment, the displacement of the detection diaphragm 1 can be measured by reference to the reference face 32, so that the following advantages are obtained.

(1) Even in the case where the thickness of the spacer 14 changes correspondingly to temperature, the change of the thickness does not cause error in measurement of a pressure difference or pressure.

(2) Error in measurement of a pressure difference or pressure in the case where the refractive index of the liquid 12 in the pressure chamber 19 is changed is equal to that in the case of the embodiment of FIG. 2.

(3) The pressure difference or pressure can be measured accurately through one polarization plane conserving optical fiber.

17

(4) The measurement circuit is simplified.

Figure 11:
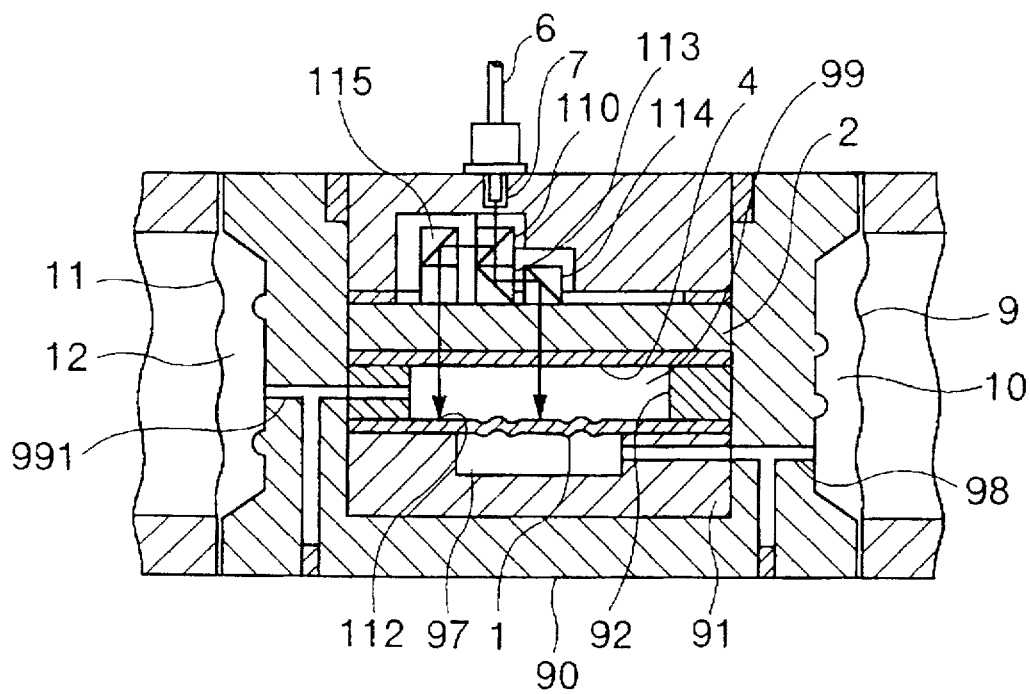
FIG. 11 is a vertical sectional view showing a further example of the detector used in the measurement apparatus according to the present invention.

FIG. 11 shows a further embodiment of the differential pressure detector used in the measurement apparatus according to the present invention. Like numerals in each of FIGS. 10 and 11 refer to like parts. In this embodiment, laser light outputted from the rod lens 7 is split into reflected light and transmitted light by the beam splitter 110. The reflected light is reflected by a mirror 115 and then enters the reference face 112. The light is reflected by the reference face 112 so as to go back to the polarization plane conserving optical fiber 6'. On the other hand, the light transmitted through the beam splitter 110 is reflected by mirrors 113 and 114 so as to be led to the surface of the detection diaphragm 1 and then reflected by the surface of the detection diaphragm 1 so as to go back to the optical fiber 6.

In this embodiment, not only the same effect as in the previous embodiment can be obtained but also displacement in the path difference of the laser light outputted from the rod lens 7 can be corrected.

Figure 12:
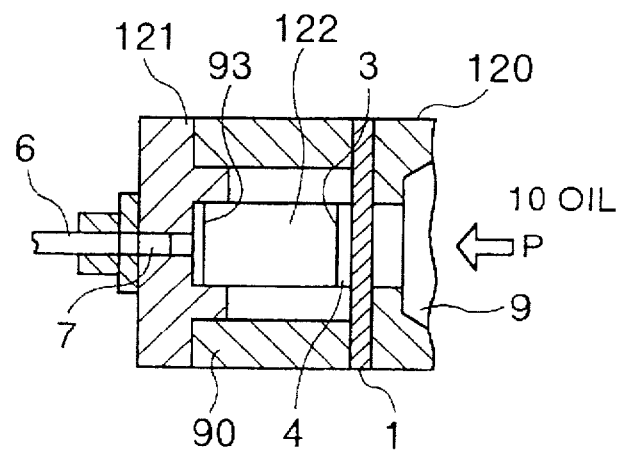
FIG. 12 is a vertical sectional view showing a further example of the detector used in the measurement apparatus according to the present invention.

FIG. 12 shows an embodiment of a light interference type pressure detector used in the measurement apparatus according to the present invention. Like numerals in each of FIGS. 1 and 11 refer to like parts. In this embodiment, a photoelastic element 122 coated with a ¼ wavelength film 4 by vapor deposition is put between an upper cover 120 and a bottom plate 121. Pressure P to be measured is applied to the photoelastic element 122 through oil 10 and the diaphragm 1. This photoelastic element 122 has two axis which intersect each other perpendicularly. If the directions of two orthogonal planes of linear polarization for laser light outputted from the rod lens 7 are made coincident with the crystal axes of the photoelastic element 122, a phase difference proportional to the pressure P to be measured is produced between the two linearly polarized light beams.

Further, the crystal axes of the ¼ wavelength film 4 are rotated by 45° from the crystal axes of the photoelastic element 122. Part of light outputted from the rod lens 7 is reflected by the semipermeable film 93. The residual part of light passes through the photoelastic element 122 and the ¼ wavelength film 4 and then is reflected by the reflection face 3. If the respective reflected light beams are made to pass through the optical fiber 6 again and connected to the pressure measurement circuits shown in FIGS. 2, 5 and 7, the pressure P acting on the photoelastic element 122 can be measured.

Figure 13:
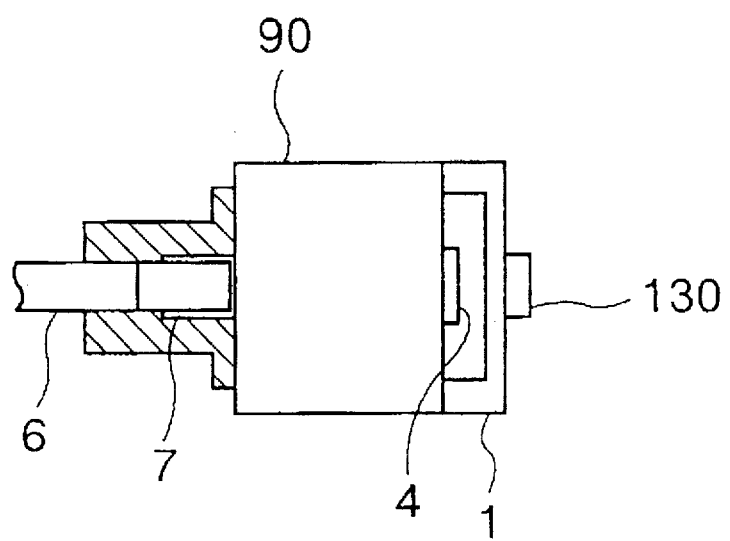
FIG. 13 is a vertical sectional view showing a further example of the detector used in the measurement apparatus according to the present invention.

Although the above description has been made upon the case where pressure is measured, the invention can be applied to the case where acceleration is measured. For example, if a mass 130 is attached to the center portion 130 of the diaphragm 1 as shown in FIG. 13, acceleration can be measured in the same manner as the pressure measurement described above because the diaphragm 1 is transformed proportionally to horizontal acceleration. Further, if the mass 130 attached to the diaphragm 1 in FIG. 13 is replaced by a load applied to the diaphragm 1 directly, the load can be measured.

As described above, the differential pressure detector or pressure detector of the present invention is provided as a full optical system, so that there arises an advantage in that not only the detector is essentially of a safe and explosion-proof type but also the influence of electromagnetic noise is avoided.

Further, the aforementioned expression (25) does not contain $\Delta\phi_{CO}\lambda_1$, $\Delta\phi_F\lambda_1$, $\Delta\phi_{CO}\lambda_2$ and $\Delta\phi_F\lambda_2$. That is, even in the case where a phase difference produced between two linearly polarized light beams having planes of polarization which intersect each other perpendicularly when the voltage applied to the electro-optical crystal is zero and a phase difference produced between two linearly polarized light beams in a period of light transmission in the polarization plane conserving optical fiber change correspondingly to ambient temperature and external force acting on the optical fiber, pressure can be measured regardless of measurement accuracy. Further, because the distance 1 between the reference face and the pressure-receiving plate is measured, measurement can be made by one measurement circuit as long as outputs from a plurality of detectors can be selected successively. Further, it is apparent from the expression (25) that the magnitude of error is constant regardless of the measurement range because the second term in the right side of the expression (25) merely changes with $\lambda_1/2n$ as a unit when the measurement range of pressure is wide, that is, because measurement accuracy is determined by the first term.

Further, it is apparent from the expression (25) that in the case where the space between the reference face and the pressure-receiving plate is filled with a liquid having a refractive index n larger than 1, $e\lambda_1$ becomes larger compared with that in the air, with respect to the same distance 1. That is, sensitivity for measurement of the distance 1 is improved.

Further, the pressure detector shown in FIG. 9 is reduced in size and simplified in structure because the detection diaphragm 1 transformed proportionally to pressure or differential pressure serves as a protecting mechanism against excessive pressure applied to the seal diaphragms 9 and 11. Further, not only even in the case where the refractive index of the liquid 12 changes correspondingly to the high pressure side pressure and temperature but also even in the case where the thickness of the spacer 13 changes, there arises an effect that the influence thereof is avoided.

Further, in the pressure detector shown in FIG. 10, the same effect as in the pressure detector shown in FIG. 9 can be obtained through one polarization plane conserving optical fiber.

Although the above description of pressure measurement has been made upon the case where the displacement of the pressure-receiving plate transformed proportionally to pressure is measured by a light interference method, the same effect is also obtained in the case where a photoelastic element having a refractive index changing correspondingly to pressure is used.

As described above, in accordance with the present invention, the quantity of displacement of the diaphragm 1 and a pressure difference or pressure acting on the diaphragm 1 can be measured without any influence on measurement accuracy even in the case where the refractive index of the polarization plane conserving optical fiber changes correspondingly to the change of ambient temperature, the action of mechanical external force, or the like. Further, by using two linear polarization laser beams of different wavelengths, the measurement range can be widened. As a result, not only the physical quantity of a subject to be measured can be measured accurately even in the case where the range of measurement changes widely, but also the physical quantity, such as displacement, or the like, of a subject to be measured located in a remote place can be measured by using a small-sized detector and an optical fiber.

What is claimed is:

1. An apparatus for optically measuring a physical quantity of an object, which comprises:
   two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for detecting voltages, applied to said electro-optical crystal, at which one of a maximum value, a minimum value, and an average value of a maximum value and a minimum value of intensity of light beams extracted by said first and second polarization beam splitters is obtained and for obtaining the applied voltages and a difference between said applied voltages; and means for calculating the quantity of displacement of the object on the basis of the difference between said applied voltages obtained by said detecting means.

2. An apparatus for optically measuring a physical quantity of an object, which comprises:

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for detecting voltages, applied to said electro-optical crystal, at which one of a maximum value, a minimum value, and an average value of a maximum value and a minimum value of intensity of light beams extracted by said first and second polarization beam splitters is obtained and for obtaining the applied voltages and a difference between said applied voltages;

means for calculating the quantity of displacement of the object on the basis of the difference between said applied voltages obtained by said detecting means; and means for calculating pressure acting on the object on the basis of the quantity of displacement of the object calculated by said displacement calculating means.

3. An apparatus for optically measuring a physical quantity of an object, which comprises:

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for detecting voltages, applied to said electro-optical crystal, at which one of a maximum value, a minimum value, and an average value of a maximum value and a minimum value of intensity of light beams extracted by said first and second polarization beam splitters is obtained and for obtaining the applied voltages and a difference between said applied voltages;

means for calculating the quantity of displacement of the object on the basis of the difference between said applied voltages obtained by said detecting means; and means for calculating a pressure difference acting on the object on the basis of the quantity of displacement of the object calculated by said displacement calculating means.

4. An apparatus for optically measuring a physical quantity of an object, which comprises:

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for detecting voltages, applied to said electro-optical crystal, at which one of a maximum value, a minimum value, and an average value of a maximum value and a minimum value of intensity of light beams extracted by said first and second polarization beam splitters is obtained and for obtaining the applied voltages and a difference between said applied voltages;

means for calculating the quantity of displacement of the object on the basis of the difference between said applied voltages obtained by said detecting means; and means for calculating an acceleration acting on the object on the basis of the quantity of displacement of the object calculated by said displacement calculating means.

5. An apparatus for optically measuring a physical quantity of an object, which comprises:

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two by the wavelengths;

a first polarization beam splitter by which reflected light of one wavelength extracted by said beam splitter is split into two by polarization planes;

a second polarization beam splitter by which reflected light of the other wavelength extracted by said beam splitter is split into two by polarization planes;

means for converting the respective changes of intensity of light beams extracted by said first and second polarization beam splitters into electric signals and for obtaining average values of maximum values and minimum values of the electric signals, respectively;

means for generating electric signals obtained by subtracting the average values obtained by said converting means from the electric signals of said converting means, respectively;

means for detecting voltages applied to said electro-optical crystal in a moment when the electric signals generated by said generating means cross at a zero point and for obtaining the applied voltages and the difference between the applied voltages; and means for calculating the physical quantity acting on the object on the basis of the applied voltage difference obtained by said detecting means.

6. An apparatus for optically measuring a physical quantity of an object, which comprises:

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators on the basis of a phase component $\Delta\phi$ determined by $A \cdot \sin\omega t$ wherein an amplitude $A$ satisfies zeroth-order Bessel function $J_0(A)=0$ and a phase $\omega$ represents the frequency of said voltage;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for converting the respective changes of intensity of light beams extracted by said first and second polarization beam splitters into electric signals;

means for detecting voltages applied to said electro-optical crystal in a moment when the electric signals obtained by said converting means cross at a zero point and for obtaining the applied voltages and the difference between the applied voltages; and means for calculating the physical quantity acting on the object on the basis of the applied voltage difference obtained by said detecting means.

7. An apparatus for optically measuring a physical quantity of an object, which comprises:

two laser oscillators for respectively emitting linearly polarized light beams having wavelengths different from each other;

a half mirror for transmitting the polarized light beams emitted from said laser oscillators;

a polarization plane conserving optical fiber through which light given from said half mirror is made to go out to the object side and through which reflected light from the object side is made to go out to the half-mirror side;

a ¼ wavelength plate located between the object and the object side end portion of said polarization plane conserving optical fiber;

a beam splitter by which reflected light from the half-mirror side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for obtaining the phase difference between light beams extracted by said first and second polarization beam splitters; and means for calculating the physical quantity acting on the object on the basis of the phase difference obtained by said obtaining means.

8. An apparatus for optically measuring a physical quantity of an object, which comprises:

an object which is transformed by suffering pressure;

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for detecting voltages, applied to said electro-optical crystal, at which one of a maximum value, a minimum value, and an average value of a maximum value and a minimum value of intensity of light beams extracted by said first and second polarization beam splitters is obtained and for obtaining the applied voltages and a difference between said applied voltages; and means for calculating the quantity of displacement of the object on the basis of the difference between said applied voltages obtained by said detecting means.

9. An apparatus for optically measuring a physical quantity of an object, which comprises:

an object which is transformed by suffering pressure;

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for detecting voltages, applied to said electro-optical crystal, at which one of a maximum value, a minimum value, and an average value of a maximum value and a minimum value of intensity of light beams extracted by said first and second polarization beam splitters is obtained and for obtaining the applied voltages and a difference between said applied voltages;

means for calculating the quantity of displacement of the object on the basis of the difference between said applied voltages obtained by said detecting means; and means for calculating pressure acting on the object on the basis of the quantity of displacement of the object calculated by said calculating means.

10. An apparatus for optically measuring a physical quantity of an object, which comprises:

an object which is transformed by suffering pressure from its opposite sides;

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelengths extracted by said beam splitter is split into two by polarization planes;

a second polarization beam splitter by which reflected light of the other wavelength extracted by said beam splitter is split into two by polarization planes;

means for detecting voltages, applied to said electro-optical crystal, at which one of a maximum value, a minimum value, and an average value of a maximum value and a minimum value of intensity of light beams extracted by said first and second polarization beam splitters is obtained and for obtaining the applied voltages and a difference between said applied voltages;

means for calculating the quantity of displacement of the object on the basis of the difference between said applied voltages obtained by said detecting means; and means for calculating a pressure difference acting on the object on the basis of the quantity of displacement of the object calculated by said displacement calculating means.

11. An apparatus for optically measuring a physical quantity of an object, which comprises:

a plurality of objects which are transformed by suffering pressure from their opposite sides;

two laser oscillators for respectively emitting linearly polarized light beams having wavelengths different from each other;

a half mirror for transmitting the polarized light beams emitted from said laser oscillators;

an electro-optical crystal driven by a voltage for modulating the phase of light emitted from said laser oscillators;

a polarization plane conserving optical fiber through which light given from said electro-optical crystal is made to go out to the object side of a selected one of said plurality of objects by means of an optical switch and through which reflected light from the object side is made to go out to the electro-optical crystal side;

a ¼ wavelength plate located between the object and the object side end portion of said polarization plane conserving optical fiber;

a beam splitter by which reflected light from the electro-optical crystal side end portion of said polarization plane conserving optical fiber is split into two correspondingly to the wavelengths;

a first polarization beam splitter by which reflected light of one of the wavelength extracted by said beam splitter is split into two by polarization planes;

a second polarization beam splitter by which reflected light of the other wavelength extracted by said beam splitter is split into two by polarization planes;

means for detecting voltages, applied to said electro-optical crystal, at which one of a maximum value, a minimum value, and an average value of a maximum value and a minimum value of intensity of light beams extracted by said first and second polarization beam splitters is obtained and for obtaining the applied voltages and the difference between the applied voltages;

means for calculating the quantity of displacement of the object on the basis of the applied voltage difference obtained by said detecting means; and means for calculating a pressure difference acting on the object on the basis of the quantity of displacement of the object calculated by said displacement calculating means.

12. An apparatus for optically measuring a physical quantity of an object, which comprises:

an object which is transformed by suffering pressure;

two first laser oscillators for respectively emitting linearly polarized light beams having wavelengths different from each other;

a first half mirror for transmitting the polarized light beams emitted from said first laser oscillators;

a first electro-optical crystal driven by a voltage for modulating the phase of light emitted from said first laser oscillators;

a first polarization plane conserving optical fiber through which light given from said first electro-optical crystal is made to go out to a transformable side of the object and through which reflected light from the object side is made to go out to the first electro-optical crystal side;

a first ¼ wavelength plate located between the object and the object side end portion of said first polarization plane conserving optical fiber;

a first beam splitter by which reflected light from the first electro-optical crystal side end portion of said first polarization plane conserving optical fiber is split into two correspondingly to the wavelengths;

a first polarization beam splitter by which reflected light of one of the wavelengths extracted by said first beam splitter is split into two by polarization planes;

a second polarization beam splitter by which reflected light of the other wavelength extracted by said first beam splitter is split into two by polarization planes;

first means for detecting voltages, applied to said first electro-optical crystal, at which one of a maximum value, a minimum value, and an average value of a maximum value and a minimum value of intensity of light beams extracted by said first and second polarization beam splitters is obtained and for obtaining the applied voltages and a difference between said applied voltages;

first displacement quantity calculating means for calculating the quantity of displacement of the object on the basis of the difference between said applied voltages obtained by said first means;

two second laser oscillators for respectively emitting linearly polarized light beams having wavelengths different from each other;

a second half mirror for transmitting the polarized light beams emitted from said second laser oscillators;

a second electro-optical crystal driven by a voltage for modulating the phase of light emitted from said second laser oscillators;

a second polarization plane conserving optical fiber through which light given from said second electro-optical crystal is made to go out to a transformable side of the object and through which reflected light from the object side is made to go out to the second electro-optical crystal side;

a second ¼ wavelength plate located between the object and the object side end portion of said first polarization plane conserving optical fiber;

a second beam splitter by which reflected light from the first electro-optical crystal side end portion of said second polarization plane conserving optical fiber is split into two correspondingly to the wavelengths;

a third polarization beam splitter by which reflected light of one of the wavelengths extracted by said second beam splitter is split into two by polarization planes;

a fourth polarization beam splitter by which reflected light of the other wavelength extracted by said second beam splitter is split into two by polarization planes;

second means for detecting voltages, applied to said second electro-optical crystal, at which one of a maximum value, a minimum value, and an average value of a maximum value and a minimum value of intensity of light beams extracted by said third and fourth polarization beam splitters is obtained and for obtaining the applied voltages and a difference between said applied voltages;

second displacement quantity calculating means for calculating the quantity of displacement of the object on the basis of the difference between said applied voltages obtained by said second calculating means; and third means for calculating pressure acting on said object on the basis of calculated values from said first and second displacement quantity calculating means.

13. An apparatus for measuring a physical quantity of an object according to claim 1, further comprising:

a frame for covering and holding said object;

input-output light guiding means which is arranged in said frame so as to make measuring light be incident into said object through said ¼ wavelength plate and so as to make light reflected by said object go out from said input-output light guiding means; and an optical fiber mounting portion which is arranged in said frame so that an end portion of said polarization plane conserving optical fiber is disposed so as to be opposite to said input-output light guiding means.

14. An apparatus for measuring a physical quantity of an object according to claim 12, further comprising:

a frame for covering and holding said object;

input-output light guiding means which is arranged in said frame so as to make measuring light be incident into a transformation portion of said object through said first ¼ wavelength plate and so as to make light reflected by said object go out from said input-output light guiding means; and second input-output light guiding means which is arranged in said frame so as to make measuring light be incident into a non-transformation portion, acting as a reference face, of said object through said second ¼ wavelength plate and so as to make light reflected by said reference face of said object go out from second input-output light guiding means;

a first optical fiber mounting portion which is arranged in said frame so that an end portion of said first polarization plane conserving optical fiber is arranged so as to be opposite to said first input-output light guiding means; and a second optical fiber mounting portion which is arranged in said frame so that an end portion of said second polarization plane conserving optical fiber is arranged so as to be opposite to said second input-output light guiding means.

15. An apparatus for measuring a physical quantity of an object according to claim 1, further comprising:

a frame for holding said object;

a birefringent body having one end joined with said ¼ wavelength plate;

input-output light guiding means which is arranged in said frame so as to make measurement light be incident into said object from said birefringent body through said ¼ wavelength plate and so as to make light reflected by said object go out from said input-output light guiding means; and an optical fiber mounting portion which is arranged in said frame so that an end portion of said polarization plane conserving optical fiber is arranged so as to be opposite to said input-output light guiding means.

16. An apparatus for measuring a physical quantity of an object according to claim 1, further comprising:

a frame for holding said object;

input-output light guiding means which is arranged in said frame so as to make measurement light be incident into said object through said ¼ wavelength plate and so as to make light reflected by said object go out from said input-output light guiding means; and an optical fiber mounting portion which is arranged in said frame so that an end portion of said polarization plane conserving optical fiber is arranged so as to be opposite to said input-output light guiding means.

* * * * *